(12) United States Patent
Jensen et al.

(10) Patent No.: US 6,907,089 B2
(45) Date of Patent: Jun. 14, 2005

(54) DIGITAL DEMODULATION AND APPLICATIONS THEREOF

(75) Inventors: Henrik Jensen, Long Beach, CA (US); Brima Ibrahim, Los Angeles, CA (US)

(73) Assignee: Broadcom, Corp., Irvine, CA (US)

( * ) Notice: Subject to any disclaimer, the term of this patent is extended or adjusted under 35 U.S.C. 154(b) by 772 days.

(21) Appl. No.: 09/993,541

(22) Filed: Nov. 14, 2001

(65) Prior Publication Data

US 2003/0091127 A1 May 15, 2003

(51) Int. Cl.[7] ............... H04L 27/14; H03D 3/24
(52) U.S. Cl. ............... 375/324; 375/376; 375/130
(58) Field of Search ................... 375/324, 130, 375/376, 326, 327; 455/302, 192.1, 254; 327/147, 156

(56) References Cited

U.S. PATENT DOCUMENTS

| | | | | |
|---|---|---|---|---|
| 4,754,340 A | * | 6/1988 | Nakagawa et al. | 386/24 |
| 6,115,432 A | * | 9/2000 | Mishima et al. | 375/326 |
| 6,229,560 B1 | * | 5/2001 | Jun | 348/21 |
| 6,335,952 B1 | * | 1/2002 | Lee et al. | 375/327 |
| 6,694,131 B1 | * | 2/2004 | Lakkis | 455/302 |
| 2002/0160734 A1 | * | 10/2002 | Li et al. | 455/245.1 |

* cited by examiner

*Primary Examiner*—Khai Tran
(74) *Attorney, Agent, or Firm*—Garlick, Harrison & Markison LLP

(57) ABSTRACT

A digital demodulator that may be utilized in integrated radio receivers and/or integrated radios includes a mixing section, $1^{st}$ and $2^{nd}$ digital comb filters, phase locked loop module, and a data recovery module. The mixing section is operably coupled to produce a digital I signal and a digital Q signal from a digital intermediate frequency signal. The $1^{st}$ comb filter filters the digital I signal while the $2^{nd}$ comb filter filters the digital Q signal. The phase locked loop module produces a digital signal from the filtered I and filtered Q signals. The data recovery module interprets the digital signal to recapture a data stream.

65 Claims, 13 Drawing Sheets

IF mixing module 14

LPF/equalizer 74

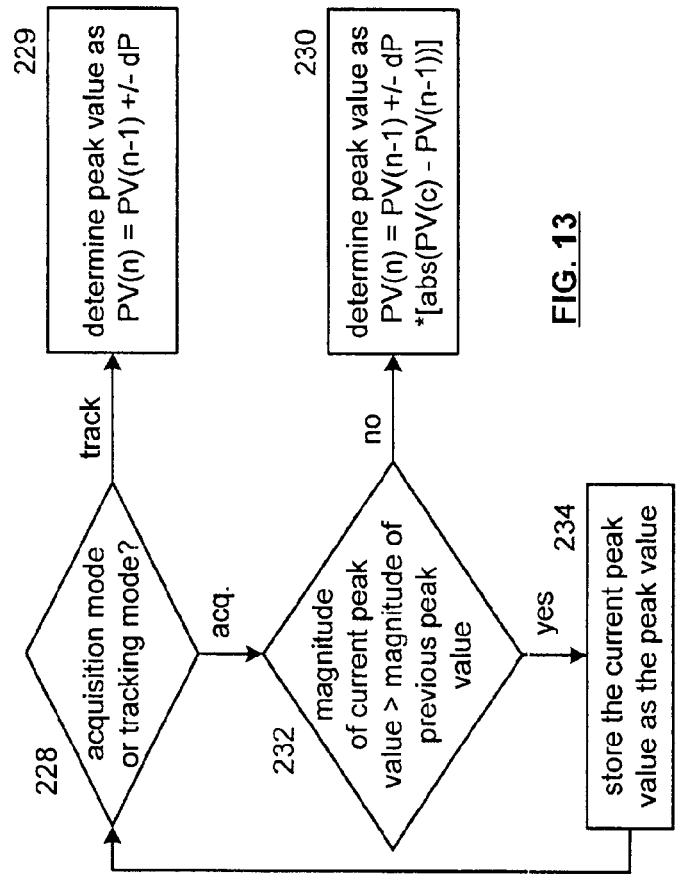
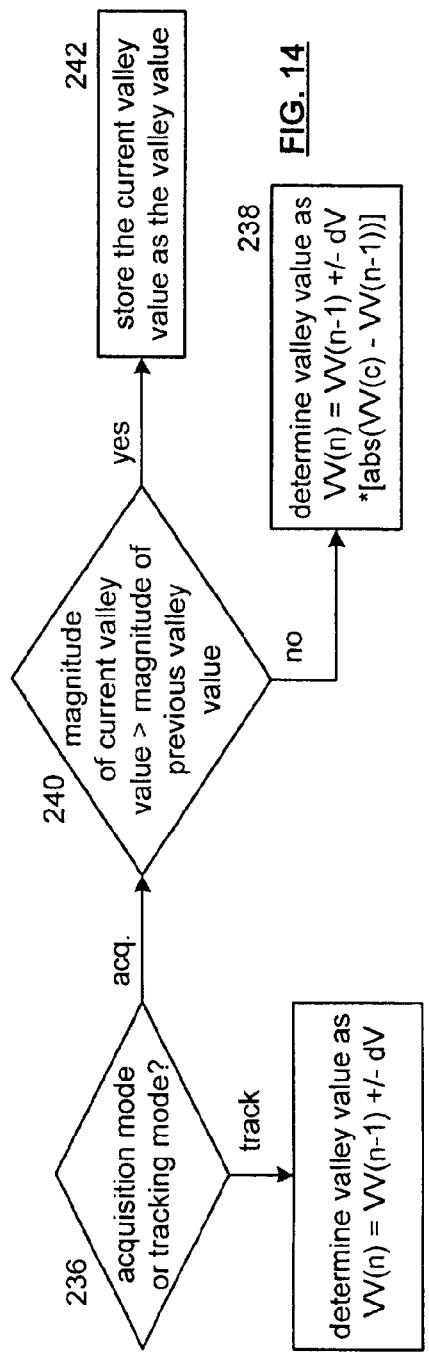
FIG. 12
FIG. 13
FIG. 14

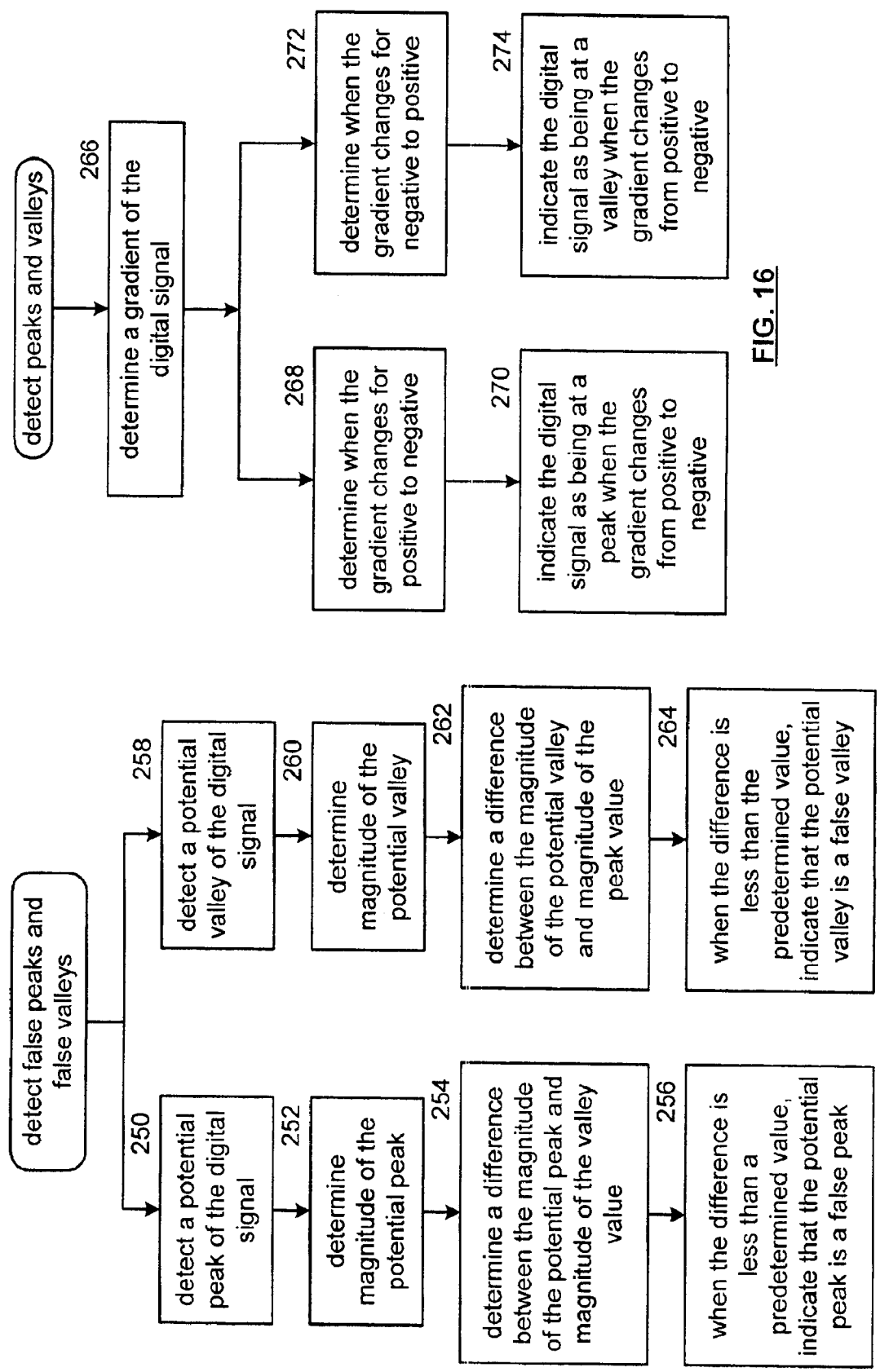

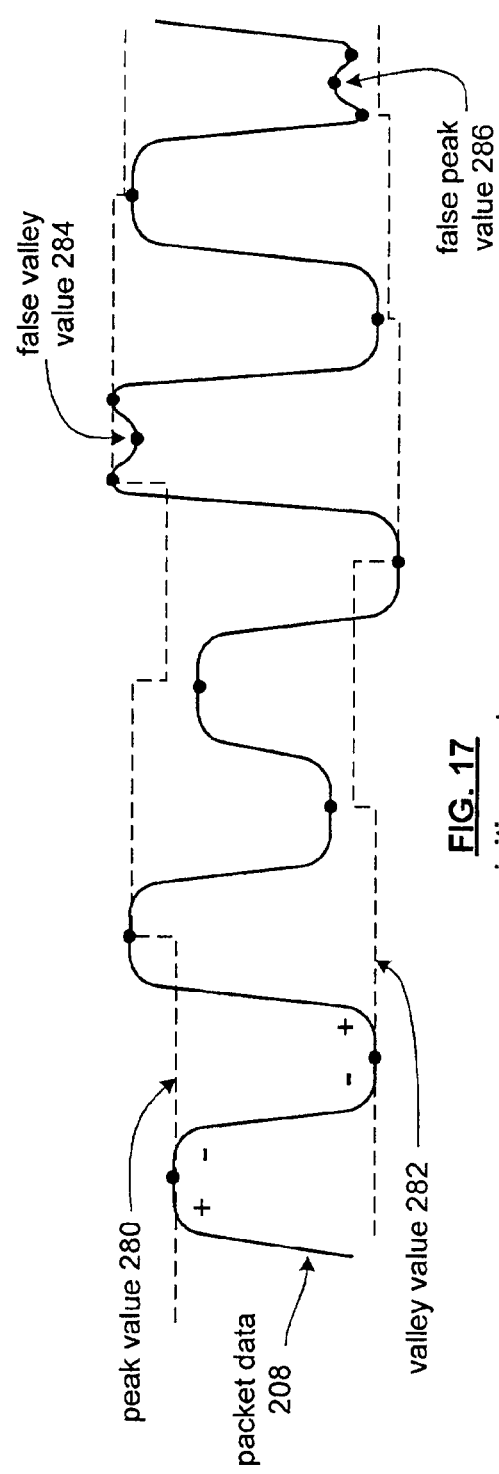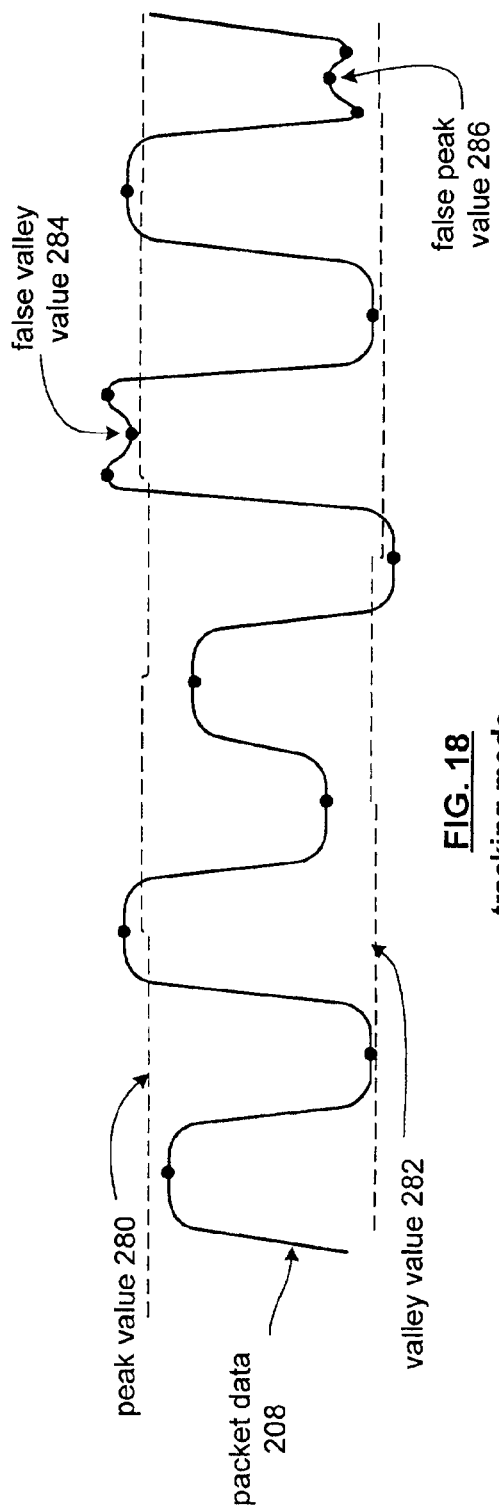

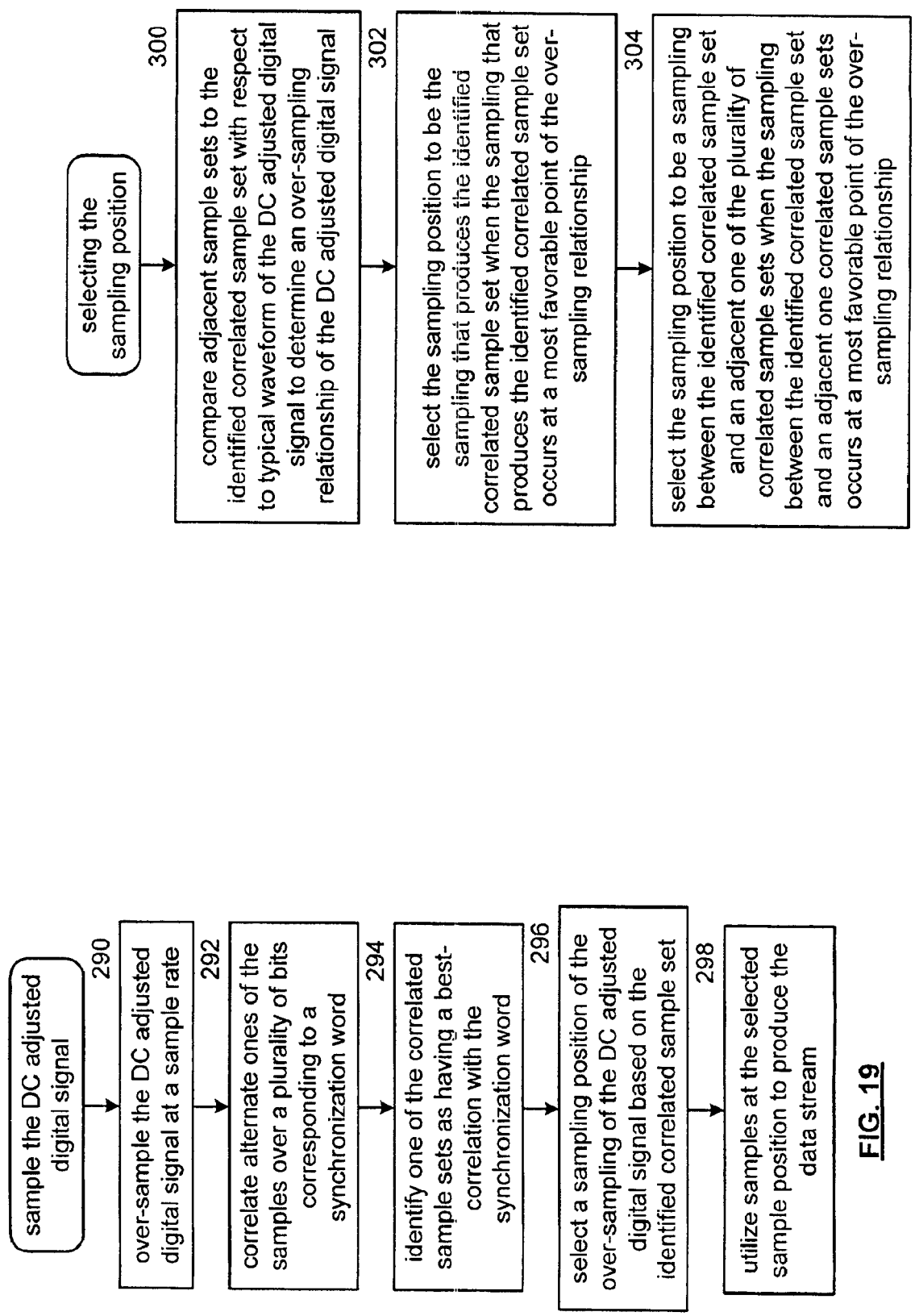

DIGITAL DEMODULATION AND APPLICATIONS THEREOF

TECHNICAL FIELD OF THE INVENTION

This invention relates generally to wireless communication and in particular to digital demodulation within wireless radio receivers.

BACKGROUND OF THE INVENTION

The use of wireless communication for in-home, in-building networks and point-to-point communications is increasing in popularity and spawning relatively new standards including, but not limited to Bluetooth, IEEE 802.11a, and IEEE 802.11b. As is known for wireless communications, data is modulated on to at least one radio frequency (RF) carrier frequency and transmitted as a RF modulated signal by a radio transmitter. A radio receiver receives the RF modulated signal and demodulates it to recapture the data.

As is further known, there are a variety of modulation/demodulation protocols that may be used for wireless communications. Such modulation/demodulation protocols include amplitude modulation (AM), frequency modulation (FM), amplitude shift-keying (ASK), frequency shift-keying (FSK), phase shift-keying (PSK), orthogonal frequency division multiplexing (OFDM), or variations thereof. As is also known, Bluetooth utilizes an FSK modulation/demodulation protocol, while IEEE 802.11a and IEEE 802.11b utilize OFDM and/or a form of PSK for its modulation/demodulation protocol.

Regardless of the particular modulation/demodulation protocol, a radio receiver generally includes an antenna section, a filtering section, a low noise amplifier, an intermediate frequency (IF) stage, and a demodulator. In operation, the antenna section receives RF modulated signals and provides them to the filtering section, which passes RF signals of interest to the low noise amplifier. The low noise amplifier amplifies the received RF signals of interest and provides them as amplified RF signals to the IF stage. The IF stage includes one or more local oscillators, one or more mixers, and one or more adders to step-down the frequency of the RF signals of interest to an intermediate frequency or to base-band. The IF stage provides the intermediate frequency signals or base-band signals to the demodulator, which, based on the demodulation protocol, recaptures the data.

A demodulator may be implemented using analog and/or digital circuitry. Digital demodulators are generally better suited for use in an integrated circuit (IC) radio receiver than analog demodulators because of reduced sensitivity to noise and less IC real estate intensive. Such demodulators typically require high order low pass filters and sophisticated DC offset correction circuitry.

Such high order low pass filters are typically required to pass the frequencies of interest and sharply attenuate other frequencies (e.g., at a rate of −60 dB/decade). To achieve such a large roll-off, digital high order low pass filters require a significant amount of logic circuits including multipliers.

For FSK demodulation, such as used in Bluetooth, the DC offset correction circuitry corrects for frequency differences between the local oscillations of IF stage in the transmitter section of a sending radio and in the receiver section of the receiving radio. Presently, such DC offset correction circuitry performs peak and valley detection to identify a peak and valley. From these values a DC value is determined (e.g., typically a midpoint between the peak and valley). The peak and valley values are continuously updated, thus the DC value is also continually updated. While this continuous updating allows for fast and continuous correction of the DC offset value, such circuitry is subject to false peak and/or valley detection. When a false peak or valley is detected, an error results in the DC value, which adversely affects the performance of a wireless radio.

Therefore, a need exists for a reliable, low cost, reduced complexity, and reduced integrated circuit real estate digital demodulator for use in integrated circuit radios and/or integrated circuit radio receivers.

BRIEF DESCRIPTION OF THE DRAWINGS

FIG. 12 illustrates a logic diagram that further describes Step 192 of FIG. 9;

FIG. 13 illustrates a logic diagram of a method that further describes the determination of a peak value at Step 220 of FIG. 12;

FIG. 14 illustrates a logic diagram of a method that further describes the determination of a valley value of Step 224 of FIG. 12;

FIG. 15 illustrates a logic diagram that expands on the logic diagram of FIG. 12 by detecting false peaks and false valleys in accordance with the present invention;

FIG. 16 illustrates a logic diagram of a method that expands on the logic diagram of FIG. 12 by detecting peaks and valleys in accordance with the present invention;

FIGS. 17 and 18 illustrate a graphical representation of determining peak and valley values during acquisition mode and tracking mode in accordance with the present invention;

FIG. 19 illustrates a logic diagram that further describes Step 196 of FIG. 9;

FIG. 20 illustrates a logic diagram that further describes Step 296 of FIG. 19;

DETAIL DESCRIPTION OF A PREFERRED EMBODIMENT

Generally, the present invention provides a digital demodulator that may be utilized in integrated radio receivers and/or integrated radios. The digital demodulator may be implemented in a variety of embodiments. One embodiment includes a mixing section, $1^{st}$ and $2^{nd}$ digital comb filters, phase locked loop module, and a data recovery module. The mixing section is operably coupled to produce a digital I signal and a digital Q signal from a digital intermediate frequency signal. The $1^{st}$ comb filter filters the digital I signal while the $2^{nd}$ comb filter filters the digital Q signal. The phase locked loop module produces a digital signal from the filtered I and filtered Q signals. The data recovery module interprets the digital signal to recapture a data stream.

In another embodiment, the digital demodulator includes a mixing section, phase locked loop module, and data recovery module. The data recovery module includes a DC offset module and a data extraction module. The mixing section produces a digital I signal and digital Q signal, which are processed by the phase locked loop module to produce a digital signal. The DC offset module, based on a DC offset value, adjusts the digital signal to produce a DC adjusted digital signal. The data extraction module processes the DC adjusted digital signal to recapture a data stream.

In yet another embodiment, the digital demodulator includes a mixing section, a phase locked loop, a low pass filter/equalizer, and a data recovery module. In this embodiment, the phase locked loop produces the digital signal from a digital I and digital Q signal, which are produced by the mixing section. The low pass filter/equalizer equalizes the digital signal and then utilizes a comb filter function to produce a filtered and equalized digital signal. The data recovery module processes the filtered and equalized digital signal to recapture a data stream. With such a variety of digital demodulator implementations, a digital demodulator is readily achieved that is reliable, low cost, has reduced integrated circuit real estate requirements, and has reduced circuit complexity requirements.

Figure 1:
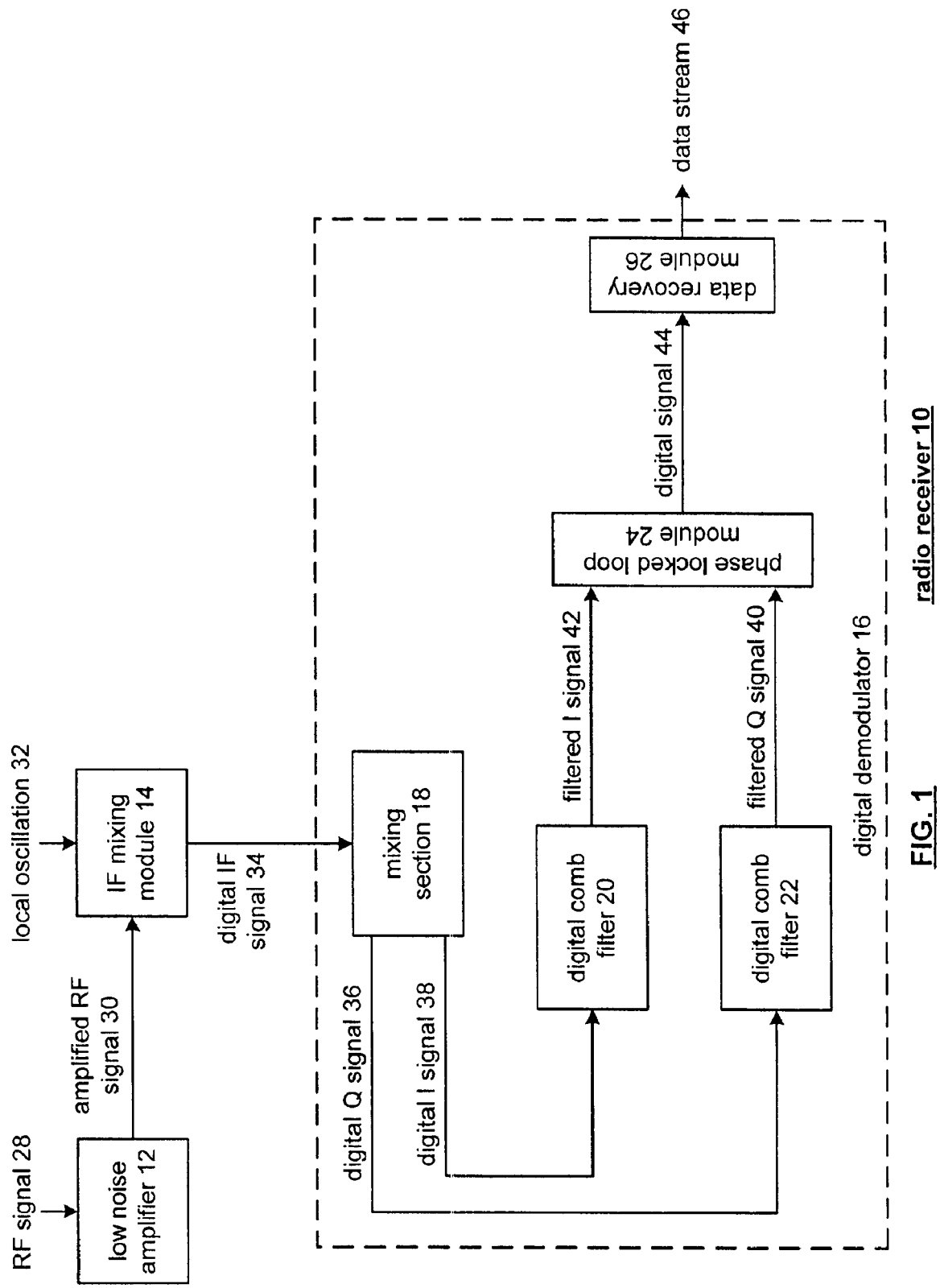
FIG. 1 illustrates a schematic block diagram of a radio receiver in accordance with the present invention.

The present invention can be more fully described with reference to FIGS. 1 through 22. FIG. 1 illustrates a schematic block diagram of a radio receiver 10 that includes a low noise amplifier 12, an intermediate frequency (IF) mixing module 14, and a digital demodulator 16. The digital demodulator 16 includes a mixing section 18, a $1^{st}$ digital comb filter 20, a $2^{nd}$ digital comb filter 22, a phase locked loop module 24 and a data recovery module 26. The low noise amplifier 12 is operably coupled to receive a radio frequency (RF) signal 28. The RF signal 28 may be representative of a wireless communication that utilizes a particular wireless standard such as Bluetooth, IEEE 802.11a, IEEE 802.11b, et cetera. The low noise amplifier 12 amplifies the PF signal 28 to produce an amplified RF signal 30.

The IF mixing module 14, which will be described in greater detail with reference to FIG. 5, mixes the amplified RF signal 30 with a local oscillation 32 to produce a digital IF signal 34. For example, if the RF signal 28 is in accordance with the Bluetooth standard, the carrier frequency is approximately 2.402 GHz. If the local oscillation 32 is 2.400 GHz, the resulting frequency of the digital IF signal 34 is 2 MHz. The digital IF signal 34 includes an I component and a Q component, where the I component represents the in-phase portion of the digital IF signal and the Q component represents the quadrature portion of the digital IF signal 34.

The mixing section 18, which will be described in greater detail with reference to FIG. 6, receives the digital IF signal 34 and produces a digital Q signal 36 and a digital I signal 38, both of which are at base-band. Accordingly, the mixing section 18 includes a local oscillation, which down converts the frequency of the digital IF signal 34 to base-band.

The digital comb filter 20 filters the digital I signal 38 to produce a filtered I signal 42. The digital comb filter 22 filters the digital Q signal 36 to produce a filtered Q signal 40. The $1^{st}$ and $2^{nd}$ digital comb filters 20 and 22 are designed using a plurality of delays and corresponding taps to provide a frequency response that has notches at the frequencies which substantially correspond to frequencies of interfering channels of the RF signal. For example, if the RF signal 28 is in accordance with the Bluetooth standard, the interfering channels will be at 1 MHz increments from the frequency of the desired channel. Accordingly, the digital comb filters 20 and 22 are constructed such that the notches of the frequency response correspond to the 1 MHz increments. By utilizing such digital comb filters to provide a low pass filter function, less circuitry is required to implement the low pass filter.

The phase locked loop (PLL) module 24 receives the filtered I signal 42 and the filtered Q signal 40 and produces therefrom a digital signal 44. The phase locked loop module 24, which will he discussed in greater detail with reference to FIG. 6, generally performs a frequency to amplitude conversion on the I and Q signals 40 and 42. As such, the digital signal 44 is an amplitude representation of the frequencies corresponding to the filtered I signal 42 and filtered Q signal 40. As is known, if the modulation scheme is frequency shift keying, a 0 is represented by a first carrier frequency and a logic 1 is represented by a second carrier frequency. For example, Bluetooth utilizes 2.402 GHz minus 160 KHz for a logic 0 and 2.402 GHz plus 160 KHz for a logic 1.

The data recovery module 26, which will be described in greater detail with reference to FIG. 6, receives the digital signal 44 and recaptures a data stream 46 therefrom. The data recovery module 26, when needed, performs a DC offset of the digital signal and then interprets the resulting waveform to recapture the data that comprises the data stream 46.

Figure 2:
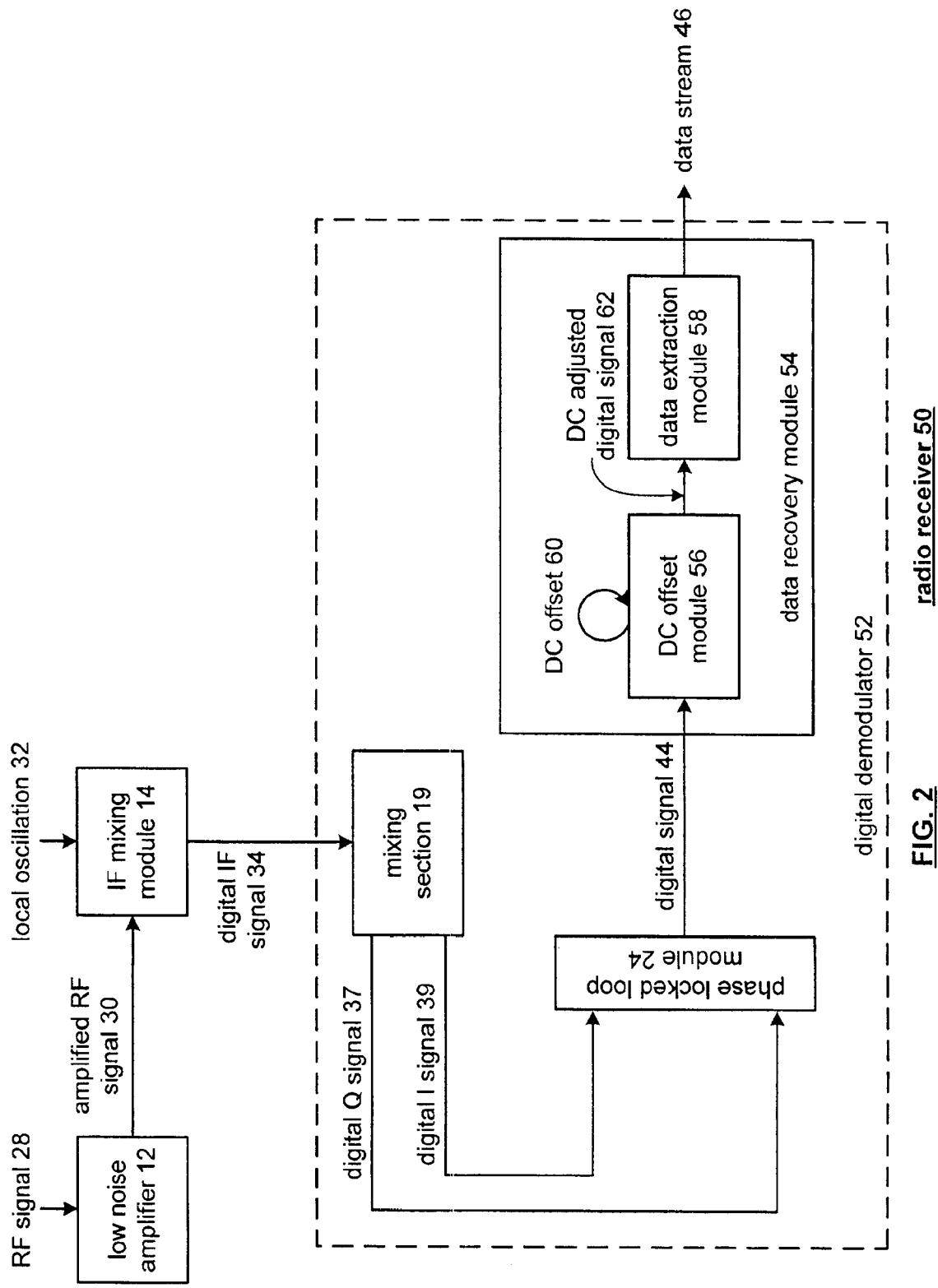
FIG. 2 illustrates a schematic block diagram of an alternate radio receiver in accordance with the present invention.

FIG. 2 illustrates a schematic block diagram of a radio receiver 50 that includes the low noise amplifier 12, the IF mixing module 14, and a digital demodulator 52. The low noise amplifier 12 and IF mixing module 14 function as previously described with reference to FIG. 1.

The digital demodulator 52 includes a mixing section 19, the phase locked loop module 24, and a data recovery module 54. The data recovery module 54 includes a DC offset module 56 and a data extraction module 58. The mixing section 19, which will be described in greater detail with reference to FIG. 6, receives the digital IF signal 30 and produces base-band digital Q signal 37 and base-band digital I signal 39. The phase locked loop module 24 receives the digital Q signal 37 and digital I signal 39 and produces the digital signal 44.

The DC offset module 56 receives the digital signal 44 and determines a DC offset 60 therefrom. The DC offset module 56 utilizes a $1^{st}$ criteria to determine the DC offset when the radio receiver is in an acquisition mode and uses a $2^{nd}$ criteria to determine the DC offset when the radio receiver is in the tracking mode. Having determined the DC offset 60, the DC offset module 56 removes the DC offset 60 from the digital signal 44 to produce a DC adjusted digital signal 62. As one of average skill in the art will appreciate, the DC offset 60 is a result of the difference in local oscillator frequencies utilized in the transmitter section of a transmitting radio and the local oscillation 32 of radio receiver 50 in the receiving radio. As one of average skill in the art will further appreciate, if the DC offset is not properly accounted for, the ability to accurately extract data from the digital signal is severely impacted. As such, the DC offset 60 needs to be accurately and reliably determined to ensure the accurate extraction of data.

The data extraction module 58 samples the DC adjusted digital signal 62 at a sampling rate to produce samples of the signal. The samples are then interpreted to produce data that comprises the data stream 46. The functionality of the DC offset module and data extraction module will be discussed in greater detail with reference to FIGS. 9 through 22.

Figure 3:
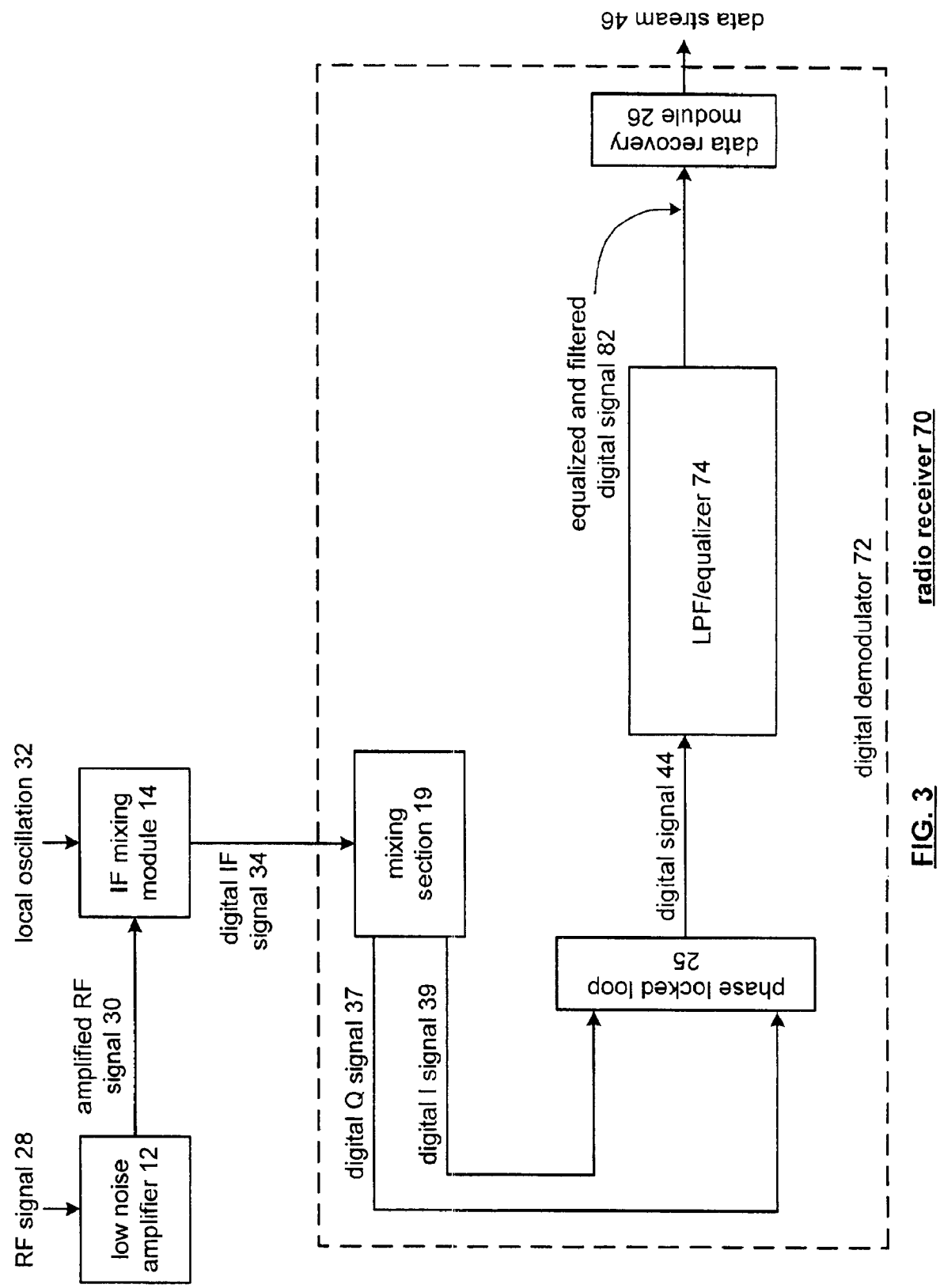
FIG. 3 illustrates a schematic block diagram of a further alternate radio receiver in accordance with the present invention.

FIG. 3 illustrates a schematic block diagram of radio receiver 70 that includes the low noise amplifier 12, the IF mixing module 14, and a digital demodulator 72. The functionality of the low noise amplifier 12 and IF mixing module 14 are as previously discussed with reference to FIG. 1.

The digital demodulator 72 includes the mixing section 19, a phase locked loop 25, a low pass filter/equalizer 74 and the data recovery module 26. The mixing section 19, which functions as previously described with reference to FIG. 2, produces a base-band digital Q signal 37 and a base-band digital I signal 39. The phase locked loop 25 receives the digital I and digital Q signals 37 and 39 and performs a frequency to amplitude conversion thereon to produce digital signal 44.

The low pass filter/equalizer 74, which will be discussed in greater detail with reference to FIGS. 7 and 8, includes a combined equalizing and low pass filtering function. The low pass filter/equalizer 74 equalizes and low pass filters the digital signal 44 to produce an equalized and filtered digital signal 82.

The data recovery module 26, which functions as previously described with reference to FIG. 1, receives the filtered digital signal 82 and produces therefrom a data stream 46.

Figure 4:
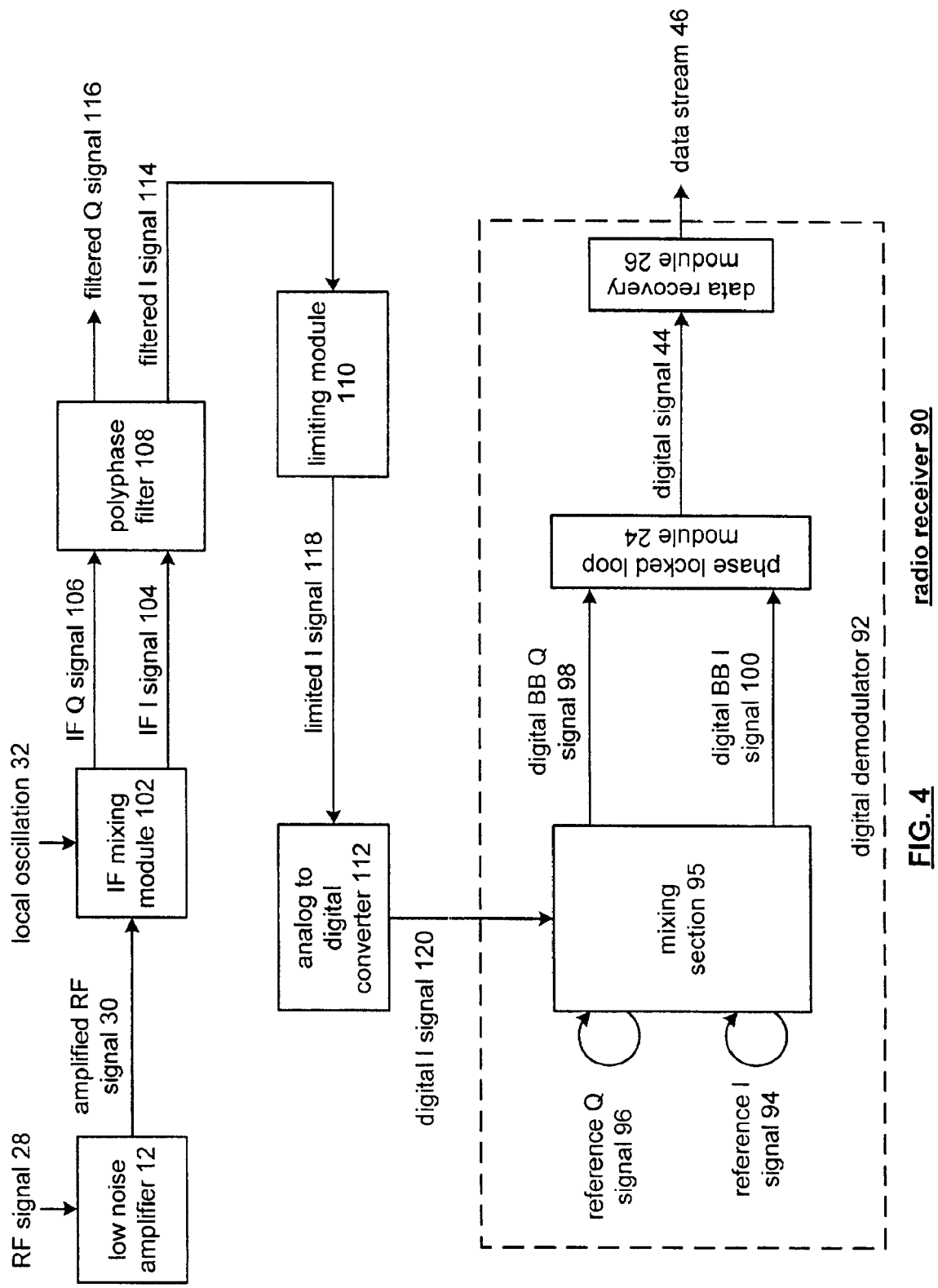
FIG. 4 illustrates a schematic block diagram of yet another radio receiver in accordance with the present invention.

FIG. 4 illustrates a schematic block diagram of radio receiver 90 that includes the low noise amplifier 12, an IF mixing module 102, a polyphase filter 104, a limiting module 110, an analog to digital converter 112 and a digital demodulator 92. The digital demodulator 92 includes a mixing section 95, the phase locked loop module 24, and the data recovery module 26.

The low noise amplifier 12 receives the RF signal 28 and produces therefrom the amplified RF signal 30. The IF mixing module 102 mixes the amplified RF signal 30 and the local oscillation 32 to produce an IF Q signal 106 and an IF I signal 104. The IF mixing module 102 may include a pair of mixers to mix the quadrature component of amplified RF signal 30 with the quadrature component of local oscillation 32 to produce the IF Q signal 106. In addition, the IF mixing module 102 may include another mixer that mixes the in-phase component of the amplified RF signal 30 with the in-phase component of the local oscillation 32 to produce IF I signal 104.

The polyphase filter 108 is operably coupled to receive the IF Q signal 106 and the IF I signal 104. The polyphase filter performs a band-pass function that filters the images produced by the IF mixing module such that only the desired tones remain for the filtered I signal 104 and filtered Q signal 116. For a further discussion on the operation of the polyphase filter 108 refer to co-pending patent application entitled XX, having a serial number of XX, and a filing date of XX.

Since the polyphase filter 108 rejects the images, only the filtered I signal 114 is utilized to extract the data stream 46. To do this, the limiting module 110 limits the magnitude of the filtered I signal 114 to produce a limited I signal 118. In essence, the limiting module 110 is taking a sinusoidal waveform (i.e., the filtered I signal 114) and producing a square wave representation thereof (i.e., the limited I signal 118).

The analog to digital converter 112 receives the limited I signal 118 and produces a digital I signal 120 therefrom. The analog to digital converter 112 may be a continuous time Sigma Delta analog to digital converter that is of a $2^{nd}$ order and has a quantizing frequency of 24 MHz. In addition, the digital I signal 120 may be a 2-bit value that is provided to the digital demodulator 92.

The mixing section 95 of digital demodulator 92 receives the digital I signal 120 and mixes it with a reference Q signal 96 and a reference I signal 94 to produce a digital base-band Q signal 98 and a digital base-band I signal 100. The reference I and Q signals 94, 96 may be provided by a local oscillator. The phase locked loop module 24 receives the digital base-band Q signal 98 and digital base-band I signal 100 and produces therefrom the digital signal 44. The data recovery module 26 interprets the digital signal 44 to produce the data stream 46.

Figure 5:
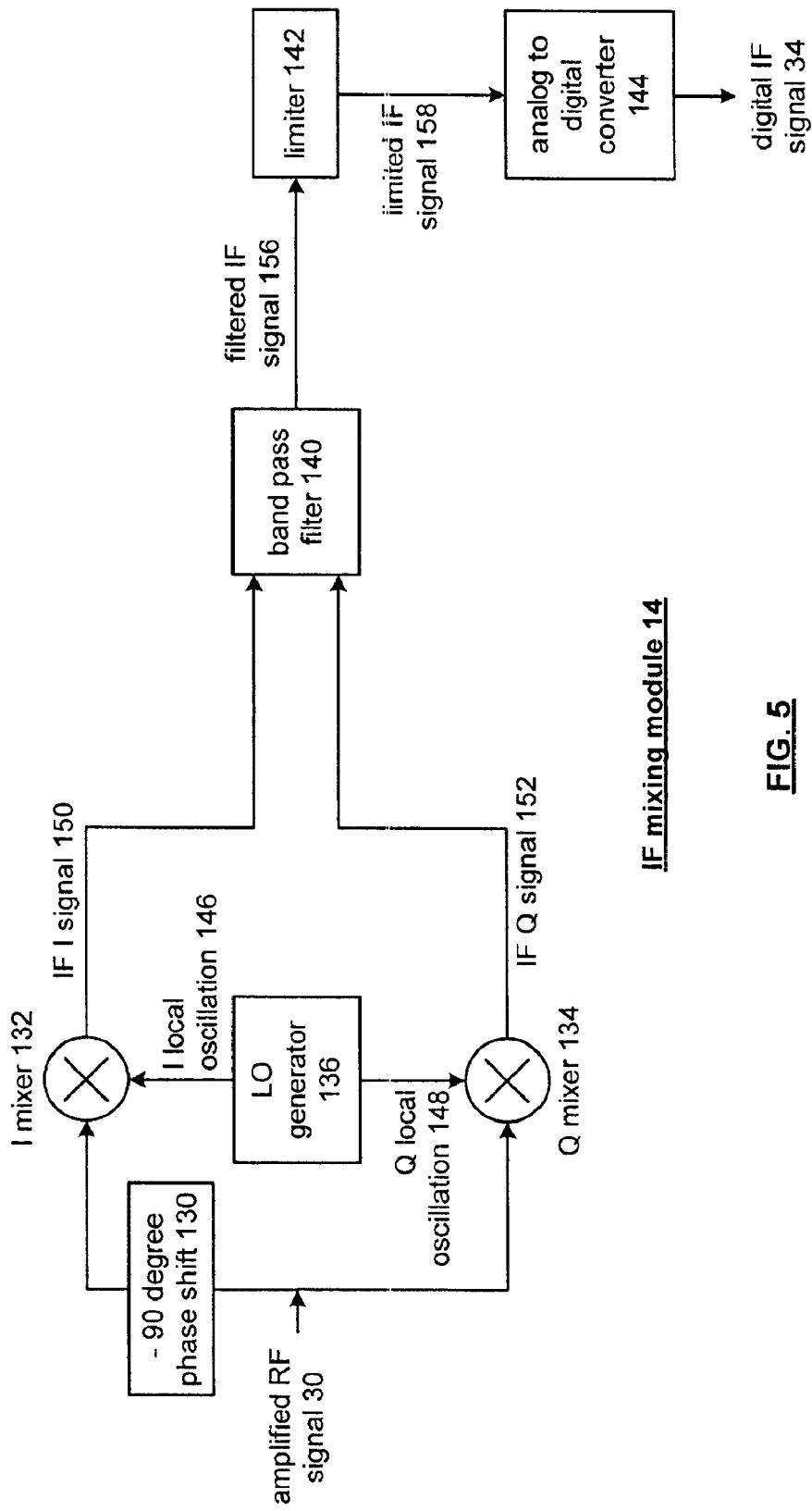
FIG. 5 illustrates a schematic block diagram of the mixing module utilized in the radio receivers of FIGS. 1 through 3.

FIG. 5 illustrates a schematic block diagram of the IF mixing module 14 of the radio receivers illustrated in FIGS. 1 through 3. The IF mixing module 14 includes an image rejection mixer that includes an I mixer 132, a Q mixer 134, a band-pass filter 140, a limiter 142, and an analog to digital converter 144.

In operation, the amplified RF signal 30 (e.g., a $\cos(\omega_{RF}t)$) is received by the. IF mixing module 14. The amplified RF signal 30 is mixed with a Q local oscillation 148 (e.g., $\cos(\omega_{IF}t)$) via Q mixer 134 to produce an IF Q signal 152. The amplified PF signal is also passed through a minus 90 degree phase shift module 130 to produce a phase shifted RF signal (e.g., $\sin(\omega_{RF}t)$). The phase shifted RF signal is mixed with an I local oscillation 146 (e.g., $\sin(\omega_{IF}t)$) via mixer 132 to produce IF I signal 150.

The band pass filter 140 filters the IF I signal 150 and IF Q signal 152 to substantially eliminate image tones and other undesired tones to produce a filtered IF signal 156. Note that the band pass filter 140 may only filter one of the IF I signal 150 and the IF Q signal 152 if the filter 150 is a poly-phase filter. The limiter 142 receives the filtered IF signal 156, which may include an I component and/or a Q component, and limits the amplitude to produce a limited IF signal 158, which will include an I component and/or a Q component. In essence, the limiter 142 is converting the sinusoidal waveform of the filtered IF signal 156 into a square wave signal (i.e., the limited IF signal 158). The analog to digital converter 144 converts the limited IF signal 158 into the digital IF signal 34.

Figure 6:
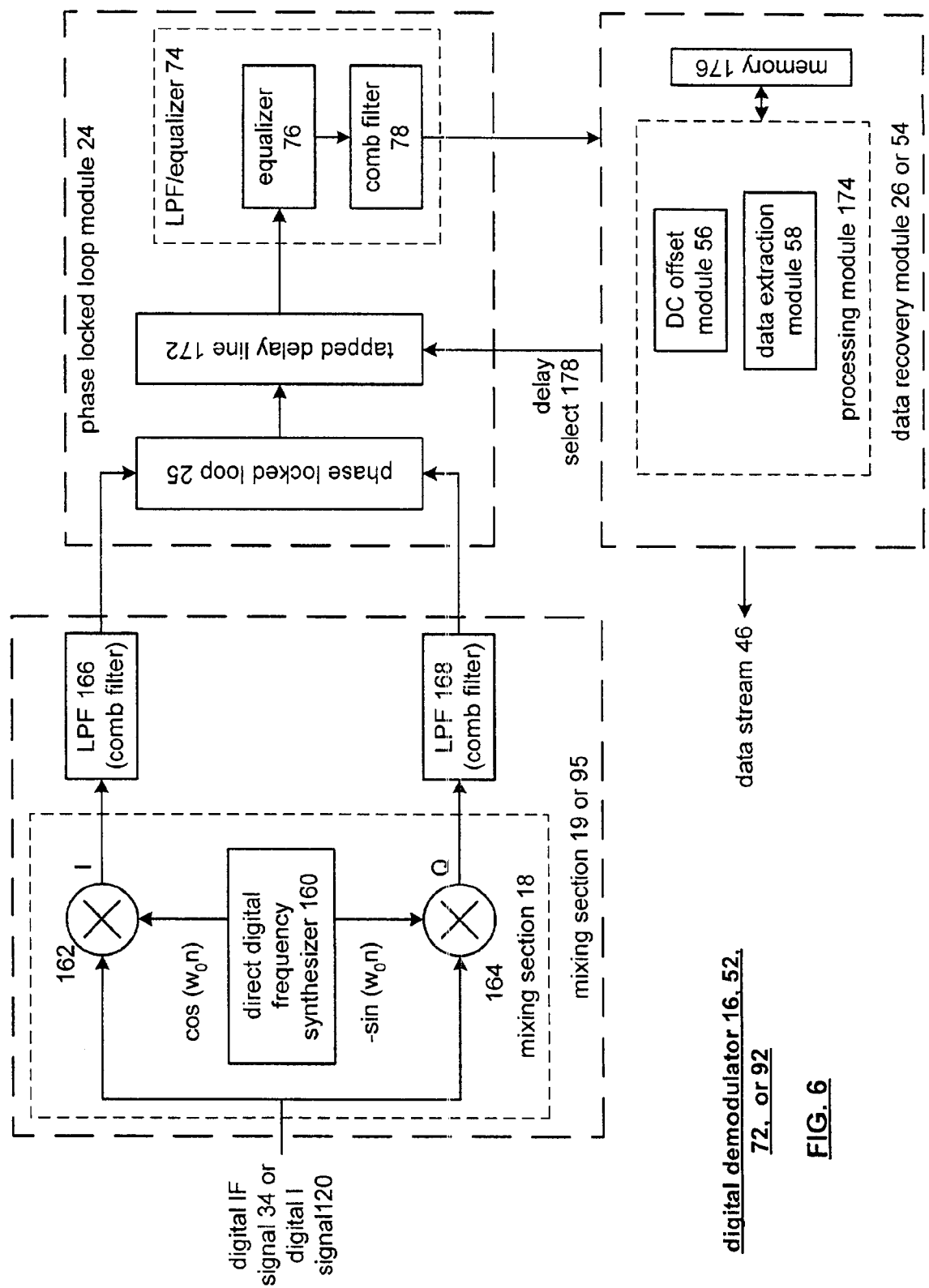
FIG. 6 illustrates a schematic block diagram of a digital demodulator that may be utilized in one or more of the radio receivers in FIGS. 1 through 4.

FIG. 6 illustrates a schematic block diagram of a digital demodulator 16, 52, 72, and/or 92. The demodulator includes mixing section 19 or 95, the phase locked loop module 24 and the data recovery module 26 or 54. The mixing section 19 or 95 includes mixing section 18, low pass filter 166 and low pass filter 168. The low pass filters 166 and 168 may be implemented utilizing a comb filter wherein the notches of the comb filter are set at frequencies corresponding to undesired tones and/or channels of the received RF signal 28.

The mixing section includes a direct digital frequency synthesizer 160, a $1^{st}$ mixing module 162 and a $2^{nd}$ mixing module 164. The direct digital frequency synthesizer (DDFS) produces a local oscillation having an in-phase component (e.g., $\cos \omega_0 t$) and a quadrature local oscillation (e.g., $-\sin \omega_0 t$). Accordingly, mixer 162 mixes the in-phase local oscillation with the in-phase component of the digital IF signal 34 or the digital I signal 120 to produce a base-band I signal. The mixer 164 mixes the quadrature local oscillation produced by DDFS 160 with the digital IF signal 34 or the digital I signal 120 to produce a quadrature component to produce a base-band Q signal.

The low pass filters 166 and 168 filter the corresponding I and Q signals, which are then provided to the phase locked loop module 24. As one of average skill in the art will appreciate, the mixing section 18 may be implemented utilizing a state machine that is operably coupled to frequency shift, by a factor of N and phase shift by a factor of $(\pi/2)$ the digital IF signal to produce the I signal and to frequency shift, by the factor of N and phase shift by $(-\pi)$ the digital IF signal to produce the digital Q signal.

The phase locked loop module 24 includes the phase locked loop 25, a tapped delay line 172, and the low pass filter/equalizer 74. The phase locked loop 25 receives the filtered I and Q signals from the mixing section 19 or 95 and performs a frequency to amplitude conversion thereon. The resulting signal is provided to the tapped delay line 172, which, based on a delay select signal 178, outputs the signal from the phase locked loop 25 with a desired delay. The delaying of the output of the phase locked loop 25 will be discussed in greater detail with reference to FIGS. 17 through 22. In general, the delaying of the output of the phase locked loop 25 is used to better align the signal with the data extraction module to enhance the reliability of data extraction.

The data recovery module 26 or 54 includes a processing module 174 and memory 176. The processing module 174 may be a single processing device or a plurality of processing devices. Such a processing device may be a microprocessor, micro-controller, digital signal processor, microcomputer, central processing unit, field programmable gate array, programmable logic device, state machine, logic circuitry, and/or any device that manipulates signals (analog and/or digital) based on operational instructions. The memory 176 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 174 implements one or more of its functions via a state machine or logic circuitry, the memory storing the corresponding operational instructions is embedded with the circuitry comprising the state machine or logic circuitry. The memory 176 stores and the processing module 174 executes at least some of the operational instructions described in with reference to FIGS. 9 through 22.

The data recovery module 26 or 54 implements the DC offset module 56 and data extraction module 58 to accurately recapture the data stream 46. The general functionality of the DC offset module 56 and data extraction module 58 were previously discussed with reference to FIG. 2 and will be described in greater detail with reference to FIGS. 9–22.

Figure 7:
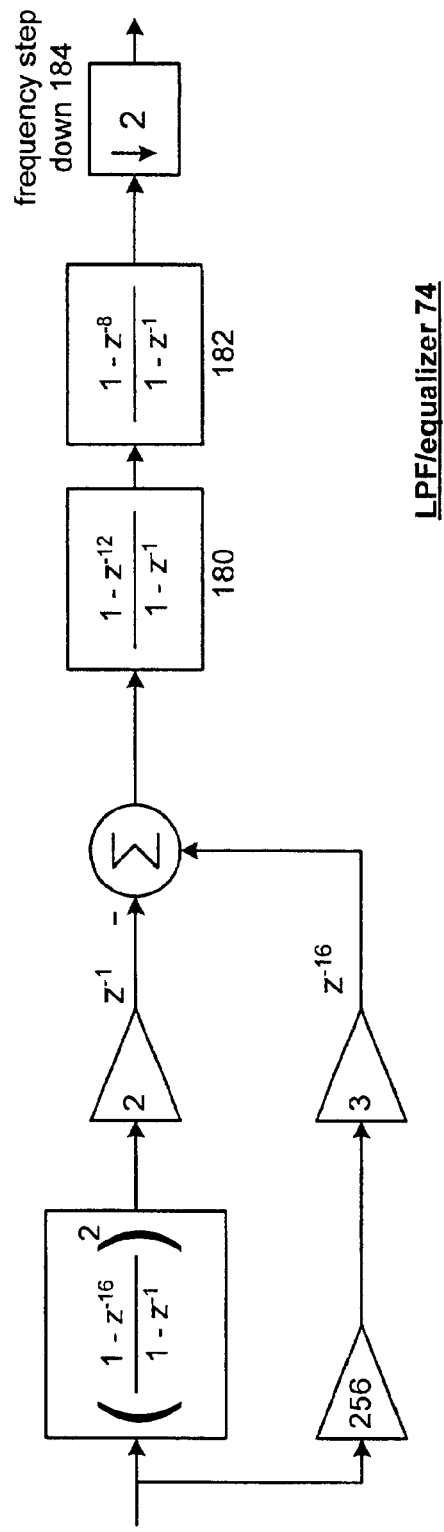
FIG. 7 illustrates a schematic block diagram of a low pass filter/equalizer that may be utilized in the digital demodulator of one or more of the radio receivers of FIGS. 1 through 4.

FIG. 7 illustrates a schematic block diagram of the low pass filter/equalizer 74. The low pass filter/equalizer 74 includes digital logic circuitry, summing module, a $1^{st}$ comb filter 180, and a $2^{nd}$ comb filter 182. The $1^{st}$ comb filter 180 is a 12-tap filter that provides notches at 1 MHz intervals while the $2^{nd}$ comb filter 182 is an 8-tap filter that provides notches at 1.5 MHz intervals. The frequency step-down converter 184 steps down the frequency of the filtered signal by a factor of 2.

Figure 8:
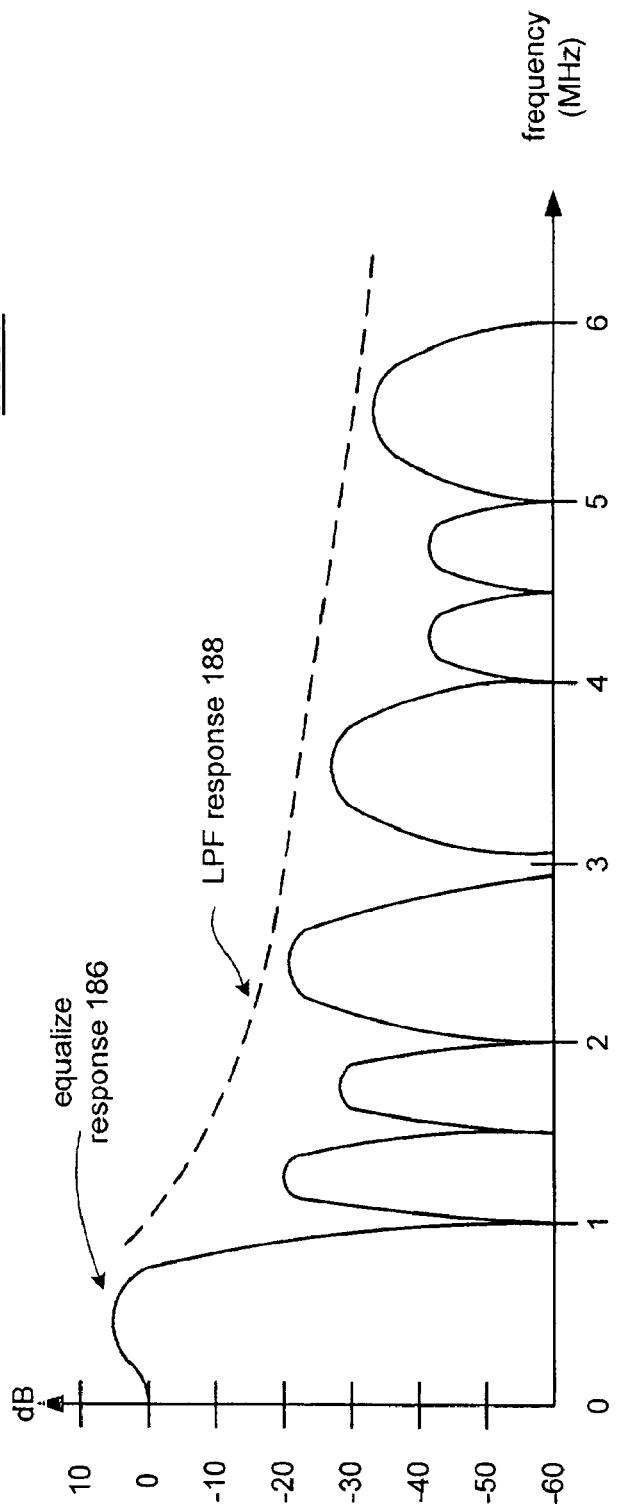
FIG. 8 illustrates a frequency response of the low pass filter/equalizer of FIG. 7.

FIG. 8 illustrates a graphical representation of the frequency response of the low pass filter/equalizer 74 of FIG. 7. The equalizer 76 provides an equalized response 186, which provides gain in the frequency range from 0 to 1 MHz. The comb filter 78 provides the low pass filtering response 188. The $1^{st}$ comb filter 180 provides the notches at 1, 2, 3, 4, 5 and 6 MHz. The 2nd comb filter 182 provides the notches at 1.5, 3, 4.5, and 6 MHz. As such, by positioning the notches of comb filters 180 and 182 at frequencies of undesired channels and images, a simple comb filter may be utilized in place of a high order low pass filter to obtain the same desired low pass filter response. As such, a digital demodulator that utilizes comb filters in this manner as opposed to high order low pass filters is less complex, thus requires less integrated circuit real estate and is less costly.

Figure 9:
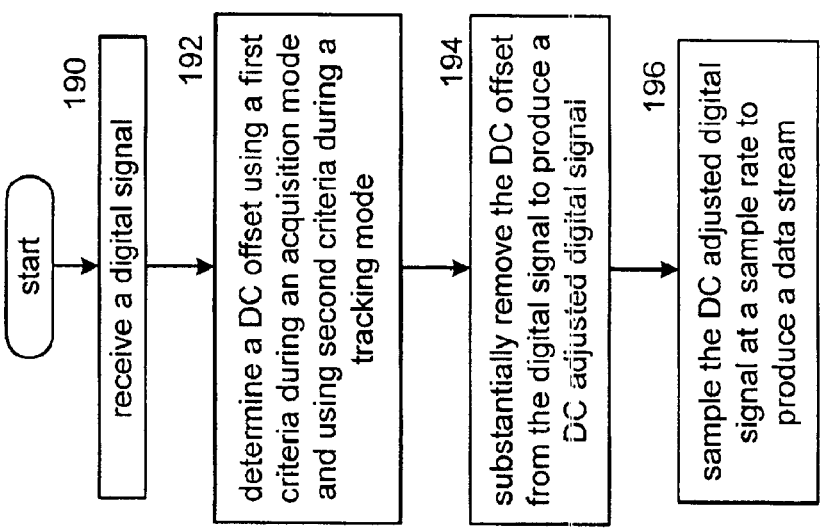
FIG. 9 illustrates a logic diagram of a method for digital demodulation in accordance with the present invention.

FIG. 9 illustrates a logic diagram of a method for digital demodulation in accordance with the present invention. The processing begins at Step 190 where a digital signal is received. The digital signal is representative of a received RF signal that has been amplified, frequency down converted, comb filtered, and frequency to amplitude converted. For example, the received RF signal is amplified to produce an amplified RF signal. The amplified RF signal is then mixed with a local oscillation to produce a digital IF signal. The digital IF signal is then mixed with a synthesized frequency to produce a digital baseband Q signal and a digital baseband I signal. The digital baseband Q signal and digital baseband I signal are then comb filtered and processed by a phase locked loop to produce the digital signal.

Alternatively, the digital signal may be produced by amplifying an RF signal and then mixing the amplified RF signal with a local oscillation to produce a digital IF signal. The digital IF signal is then mixed with a reference I signal and a reference Q signal to produce a digital baseband I signal and a digital baseband Q signal. The digital baseband I signal and digital baseband Q signal are processed by a phase locked loop to produce a digital base-band signal. The digital base-band signal may be equalized and then comb filtered to produce the digital signal.

The process then proceeds to Step 192 where a DC offset is determined utilizing a $1^{st}$ criteria when a radio receiver is in an acquisition mode and using a $2^{nd}$ criteria when the radio receiver is in a tracking mode. The determination of the DC offset will be described in greater detail with reference to FIGS. 10 through 18.

The process then proceeds to Step 194 where the DC offset is substantially removed from the digital signal to produce a DC adjusted digital signal. The process then proceeds to Step 196 where the DC adjusted digital signal is sampled at a sampling rate to produce a data stream. The sampling of the DC adjusted digital signal will be described in greater detail with reference to FIGS. 19 through 22.

Figure 10:
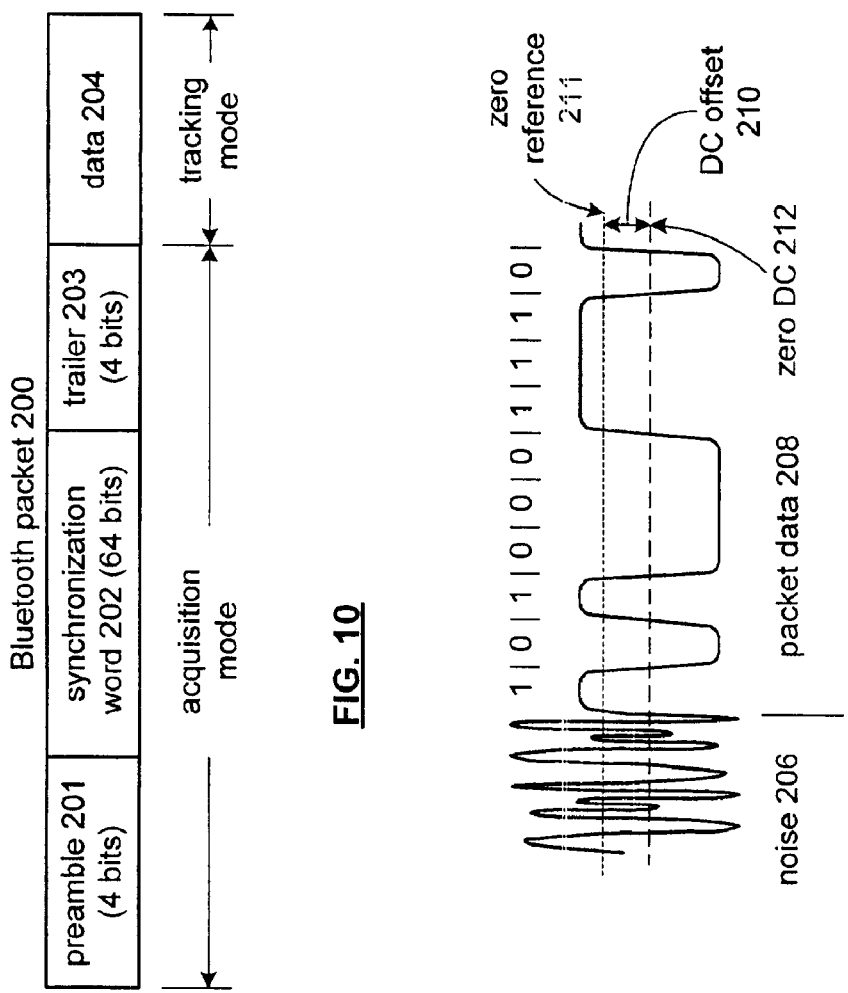
FIG. 10 illustrates a graphical diagram of a Bluetooth packet that may be processed by a radio receiver in accordance with the present invention.

FIG. 10 illustrates a Bluetooth packet 200 that includes a preamble 201, a synchronization word 202, a trailer word 203, and data 204. The Bluetooth packet 200 is modulated in accordance with an FSK modulation scheme and correspondingly demodulated via the radio receiver of the present invention. As shown, the preamble 201 (e.g., first 4 bits), the synchronization word 202 (e.g., next 64 bits), and the trailer word 203 (e.g., next 3 bits), correspond to the acquisition mode for a Bluetooth packet 200. The tracking mode includes the data section 204 and ends at the end of the packet 200.

Since the acquisition mode is relatively short, the $1^{st}$ criteria for determining the DC offset must occur very quickly to obtain a good estimation for the DC offset. During the tracking mode, which includes the data 204, the DC offset is fine tuned utilizing the $2^{nd}$ criteria. As such, the $1^{st}$ criteria allows for rapid adjustments in the DC offset while the $2^{nd}$ criteria allows for less dramatic changes in the DC offset.

Figure 11:
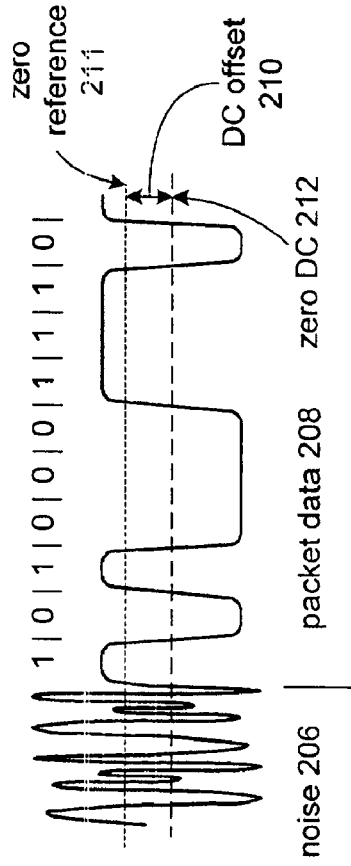
FIG. 11 illustrates a graphical representation of DC offset correction in accordance with the present invention.

FIG. 11 illustrates a graphical representation of the beginning of Bluetooth packet 200 as the digital signal 44, which is outputted from the PLL module 24. Prior to the reception of the packet, noise 206 is being received. At the commencement of the packet, which corresponds to packet data 208, the DC offset 210 is determined with respect to a zero DC level 212 and a zero reference 211. The zero reference 211 corresponds to a midpoint of the dynamic range of the digital demodulator while the zero DC level 212 corresponds to the midpoint of the data. The DC offset is the difference between the zero reference 211 and the zero DC level 212. In general, to remove the DC offset, the zero DC level 212 needs to be shifted to align with the zero reference 211. The determination of the DC offset and correcting the digital signal to remove the DC offset is further described with reference to FIGS. 12 through 18.

FIG. 12 illustrates a logic diagram for determining the DC offset. The process begins at Step 220 where a peak value of the digital signal is determined based on a current peak value, a previous peak value and the $1^{st}$ or $2^{nd}$ criteria. Such a determination will be described in greater detail with reference to FIGS. 13, 17 and 18.

The process then proceeds to Step 224 where a valley value of the digital signal is determined based on a current valley value, a previous valley value, and the $1^{st}$ or $2^{nd}$ criteria. This processing will be described in greater detail with reference to FIGS. 14, 17 and 18.

The process then proceeds to Step 226 where the DC offset is determined based on the peak value and the valley value. Typically, the DC offset represents the difference between the zero reference 211 (FIG. 11) and the center point of the peak value and the valley value.

FIG. 13 illustrates a logic diagram for determining the peak value. The process begins at Step 228 where a determination is made as to whether the radio receiver is in the acquisition mode or tracking mode. If the radio receiver is in the acquisition mode, the process proceeds to Step 232 where a determination is made as to whether the magnitude of the current peak value is greater than the magnitude of the previous peak value. If so, the process proceeds to Step 234 where the current peak value is stored as the peak value. Thus, in the acquisition mode (e.g., using the $1^{st}$ criteria) on a peak-by-peak basis, if the current peak is greater than the previous peak, the current peak value will be used as the peak value. The process then reverts to step 228.

If the magnitude of the current peak value is not greater than the magnitude of the previous peak value, the process proceeds to Step 230. At Step 230, the peak value is determined as a result of the previous peak value less a peak acquisition delta value multiplied by a difference of the current peak value and the previous peak value, wherein the $1^{st}$ criteria indicates a greater value for the peak acquisition delta value than the $2^{nd}$ criteria. In general, if the magnitude of the current peak value is not greater than the magnitude of the previous peak value, the peak value will be exponentially decreased based on the difference between the current peak value and the previous peak value. In general, the determination of the peak value may be done in accordance with the equation: $PV(n)=PV(n-1)+/-[dP*abs(PV(c)-PV(n-1)]$, wherein $PV(n)$ is the peak value, $PV(n-1)$ is the previous peak value, $dP$ is the peak acquisition delta value, and $PV(c)$ is the current peak value If the radio receiver is in the tracking mode, the peak value is determined as described at Step 229. At Step 229, the peak value is not instantaneously adjusted from peak-to-peak but exponentially changed at a much slower rate than when in acquisition mode. This may be done by using the equation $PV(n)=PV(n-1)+/-dP$, wherein $PV(n)$ is the peak value, $PV(n-1)$ is the previous peak value and $dP$ is the peak acquisition delta value. Based on this equation, if the current peak value is greater than the peak value, the dP term is added to the peak value. If the current peak value is less than the peak value, the dP term is subtracted from the peak value.

FIG. 14 illustrates a logic diagram for determining the valley value. The process begins at Step 236 where a determination is made as to whether the radio receiver is in acquisition mode or tracking mode. When in acquisition mode, the process proceeds to Step 240 where a determination as to whether the absolute value of the magnitude of the current valley is greater than the absolute value of the magnitude of the previous valley. If so, the process proceeds to Step 242 where the current valley value is stored as the valley value. As such, from valley to valley if the magnitude of the current valley is greater than the magnitude of the previous valley in acquisition mode, the current valley will be used as the valley value to determine the DC offset. The process then reverts to step 236.

If the magnitude of the current valley value is not greater than the magnitude of the previous valley value, the process proceeds to Step 238. At Step 238, the valley value is determined based on the $1^{st}$ criteria during the acquisition mode, which utilizes a greater exponential determination decrementing of the valley value from the previous valley value to the current valley value. For example, the degradation may be ½. As such, if the previous valley value was 1 and the current valley value is 0.5, the valley value that will be used is 0.75. In general for acquisition mode, the valley value is determined in accordance with the equation $VV(n)=VV(n-1)+/-[dV*abs(VV(c)-VV(n-1)]$, wherein $VV(n)$ is the valley value, $VV(n-1)$ is the previous valley value, $dV$ is the valley acquisition delta value, and $VV(c)$ is the current valley value. Based on this equation, if the current valley value is greater than the valley value, the $[dV*abs(VV(c)-VV(n-1)]$ is added to the absolute value of the magnitude of the valley value. If the current valley value is less than the valley value, the $[dV*abs(VV(c)-VV(n-1)]$ is subtracted from the absolute value of the magnitude of the valley value.

If the radio receiver is in the tracking mode, the valley value will be determined at Step 237. In this mode, the valley value will be adjusted based on an exponential change factor. The exponential change factor will be significantly smaller than when in the acquisition mode. For example, if the change factor for the acquisition mode is 0.5, the change factor in the tracking mode may be 0.05. In general, the valley value is determined in accordance with the equation VV(n)=VV(n−1)+/−dV, wherein VV(n) is the valley value, VV(n−1) is the previous valley value, and dV is the valley acquisition delta value. Based on this equation, if the current valley value is greater than the valley value, the dV term is added to the absolute value of the magnitude of the valley value. If the current valley value is less than the valley value, the dV term is subtracted from the absolute value of the magnitude of the valley value.

FIG. 15 illustrates a logic diagram for detecting false peaks and false valleys. The detection of a false peak is described in Steps 250–256. The detection of false valleys is described in Steps 258–264. At Step 250, a potential peak valley of the digital signal is detected. The process then proceeds to Step 252 where the magnitude of the potential peak is determined. The process then proceeds to Step 254 where a difference between the magnitude of the potential peak and the magnitude of a valley value is determined. The process then proceeds to Step 256 where, when the difference is less than a predetermined value, the potential peak is identified as a false peak.

At Step 258, a potential valley of the digital signal is detected. The process then proceeds to Step 260 where the magnitude of the potential valley is determined. The process then proceeds to Step 262 where a difference between the magnitude of the potential valley and the magnitude of the peak valley is determined. The process then proceeds to Step 264 where, when the difference is less than a predetermined value, the potential valley is identified as a false valley.

FIG. 16 illustrates a logic diagram of a method for detecting peaks and valleys. The process begins at Step 266 where a gradient of the digital signal is determined. The process then proceeds to Step 268 of Step 272. At Step 268 a determination is made as to when the gradient changes from a positive to a negative. The process then proceeds to Step 270 where the digital signal is indicated as being at a peak when the gradient changes from positive to negative.

At Step 272 a determination is made as to when the gradient changes from negative to positive. The process then proceeds to Step 274 where the digital signal is indicated as being at a valley when the gradient changes from positive to negative. As one of average skill in the art will appreciate, the determination of gradient of a digital signal utilizing digital logic may be done by a differential function that may be easily implemented utilizing delay modules to achieve the desired differentiation. As such, only the sign of the derivative function needs to be analyzed to determine whether a peak or valley is being identified.

FIG. 17 illustrates a graphical representation of determining the peak value 280 and the valley value 282 during the acquisition mode. As shown, the packet data 208 varies from multiple levels to other levels. In this illustration, the gradient on the 1$^{st}$ pulse of packet data 208 changes from a positive slope to a negative slope thus indicating a peak. Since this is the 1$^{st}$ peak during the acquisition mode, this value is stored as peak value 280. The gradient of the packet data 208 is continually monitored until it changes from a negative value to a positive value. This value is then used as the valley value 208. At this point in time, the DC offset may be determined as the midway point between the peak value 280 and the valley value 282.

At the next peak, since the peak is greater than the previous peak, the peak value 280 is adjusted to the magnitude of the current peak. Following the waveform, the next valley of packet data 208 is less than the previous valley value. As such, the valley value 282 is reduced based on a valley acquisition delta value of the difference between the previous valley value and the current valley value. In this example, the delta value is 50%.

Continuing with the waveform, the next peak has a magnitude that is less than the previous peak. As such, the peak value 280 is adjusted down by the peak acquisition delta value, which, for this example, is ½ of the difference between the current peak value and the previous peak value for this example.

The waveform then proceeds to the next valley point, which has a greater magnitude than the valley value 282 at that point. As such, the valley value 282 is adjusted to correspond to the magnitude of the current valley.

The next peak includes a false valley value 284. As shown, the gradient detection identifies a peak at the beginning of the pulse, which would cause the peak value 280 to be adjusted to that level since it is greater than the peak value at this point. The gradient detection circuitry would then identify the point, which has been identified as a false valley value 284, as being the next current valley value. Since the difference between the value of the potential next current valley value and the peak value 280 falls below a threshold (which may be set based on the known peak and valley values), this point is identified as a false valley. Similarly, a few pulses further in time, a false peak value 286 is identified during a valley pulse.

FIG. 18 illustrates the data packet 208 during the tracking mode. The processing is very similar to the processing described with reference to FIG. 17 other than the peak value and valley values 280 and 282, respectively, change at a much slower rate and independently of the magnitude of difference between the current value and the stored value. As shown, the peak value 280 and valley value 282 do not rapidly adjust as the peak and valley values of current pulses change. This results because the 2$^{nd}$ criteria for determining these values has a valley acquisition delta value and peak acquisition delta value that are significantly less than during the acquisition mode.

FIG. 19 illustrates a logic diagram for the sampling of the DC adjusted signal as generally described at Step 196 of FIG. 9. The process begins at Step 290 where the DC adjusted signal is over sampled at the sampling rate. The process then proceeds to Step 292 where alternating ones of the samples are correlated over a plurality of bits that correspond to the synchronization word of the current packet being processed. For example, if the over sampling rate is 6, the alternating sample points of 0, 2, and 4, or 1, 3, 5 of the DC adjusted digital signal may be correlated with the known synchronization word.

The process then proceeds to Step 294 where one of the correlated sample sets is identified as having the best correlation with the synchronization word. For example, each pulse of the DC adjusted digital signal is sampled 6 times. Three of these samples are correlated. The correlated results are then compared with the known synchronization word. The correlated sets of samples that best matches the known synchronization word is the one identified at Step 294.

The process then proceeds to Step 296 where a sampling position of the over sampling of the DC adjusted digital signal is selected based on the identified correlated sampling set. For example, if it is determined that the 2$^{nd}$ over sampling position produces the best correlation with the synchronization word, then the 2$^{nd}$ sampling position will be utilized to sample the digital signal word to accurately retrieve the desired digital information.

The process then proceeds to Step 298 where samples at the selected sample position are utilized to produce the data stream.

FIG. 20 illustrates a logic diagram for selecting the particular sampling position. This begins at Step 300 where adjacent sample sets are compared to the identified correlated sample set with respect to a typical waveform of the DC adjusted signal to determine an over sampling relationship of the DC adjusted digital signal. The process then proceeds to Step 302 where the sampling position is selected to be the sampling position that provides the identified correlated sample set when the sampling that produces the identified correlated sampling set occurs at a most favorable point of the over sampling relationship (e.g., sampling point 2). The process then proceeds to Step 304 where the sampling position is selected to be the sampling between the identified correlated sampling set and an adjacent one of the plurality of correlated sampling sets when the sampling between the identified correlated sampling set and an adjacent one correlated sampling sets occurs at a most favorable point of the over sampling relationship (e.g., sample point 3, when sampling points 2 and 4 were correlated). The sampling described in FIGS. 19 and 20 will be described graphically with reference to FIG. 22.

Figure 21:
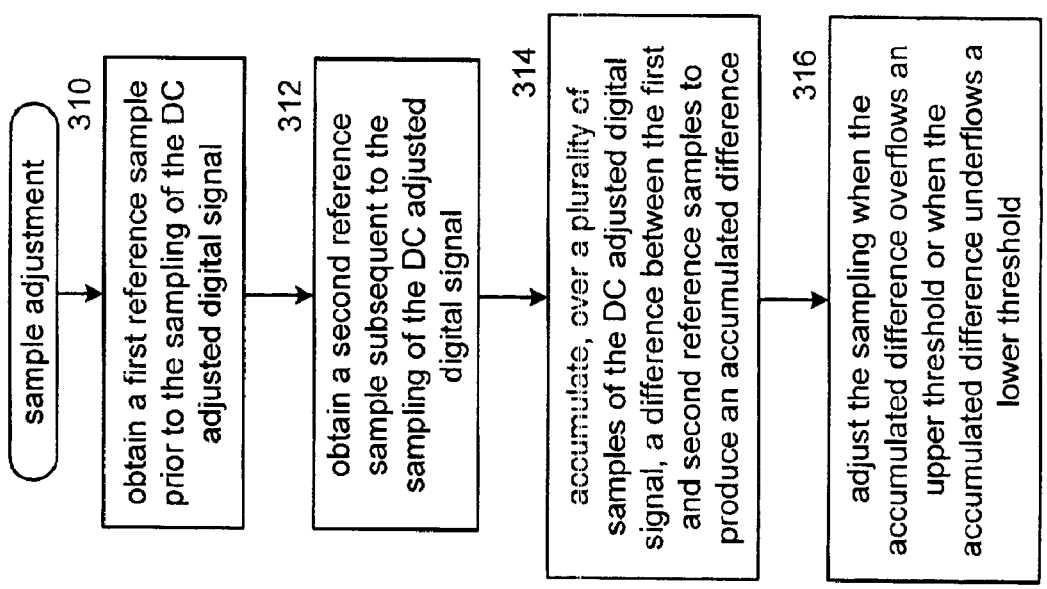
FIG. 21 illustrates a logic diagram of a method for adjusting the sampling position in accordance with the present invention.

FIG. 21 illustrates a logic diagram that adjusts the sampling position via the tapped delay line 172 of the phase locked loop module 24. The process begins at Step 310 where a $1^{st}$ reference sample is obtained prior to the sampling of the DC adjusted signal. The process then proceeds to Step 312 where a $2^{nd}$ reference sample is obtained subsequent to the data sampling of the DC adjusted digital signal. The process then proceeds to Step 314 where over a plurality of sampling of the DC adjusted digital signals a difference between the $1^{st}$ and $2^{nd}$ reference samples are accumulated to produce an accumulated difference. The process then proceeds to Step 316 where the sampling is adjusted when the accumulated difference overflows an upper threshold or when the accumulated difference underflows a lower threshold.

Figure 22:
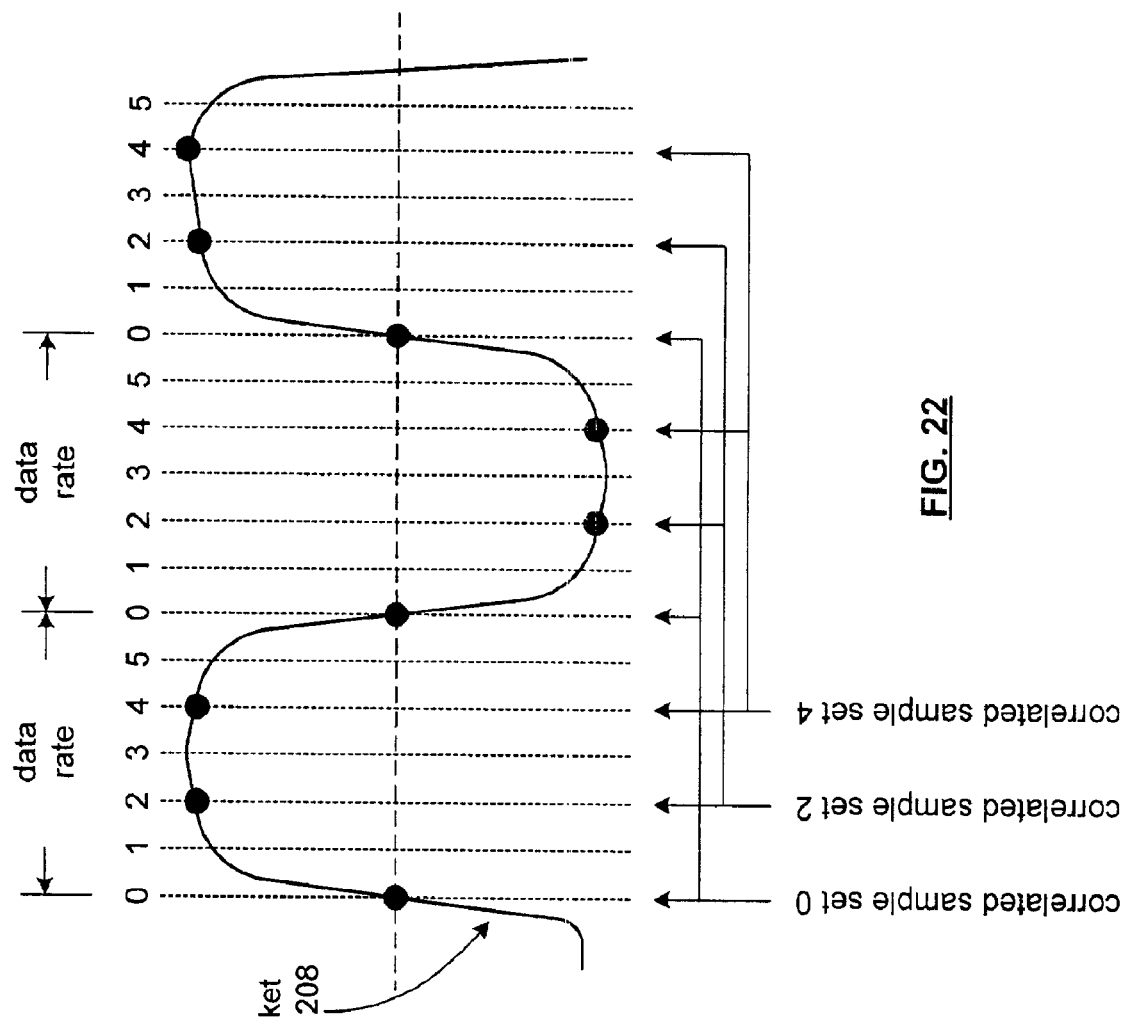
FIG. 22 illustrates a graphical representation of the sampling of a data packet in accordance with the present invention.

FIG. 22 illustrates a graphical representation of the processing described in FIGS. 19 through 21. As shown, a data packet 208 is over sampled at 6 times the data rate. Of the 6 over sampling points, only 3 per data rate are used to produce the correlated sample sets. As shown in this example, correlated sample set that occurs with the $0^{th}$ over sampling, $2^{nd}$ over sampling, and $4^{th}$ over sampling are utilized. As such, correlated sample sets 0, 2 and 4 are the sample sets being referenced in Step 292 of FIG. 19.

The particular sampling point, which corresponds to one of the 6 over sampling positions, is determined in the $1^{st}$ pulse based on the known wave shape of the data packet. In essence, the known wave shape of the data packet is a rounded square wave. As such, it will have a particular peak and a particular valley as graphically shown. For the $1^{st}$ interval, the correlated sample set 2 and correlated sample set 4 will accurately represent the data such that the correlation to the synchronization word may be readily obtained. However, as shown, the peak of the $1^{st}$ pulse actually occurs more closely in time with the $3^{rd}$ sampling interval. Thus, as described in FIG. 20, the $3^{rd}$ sampling interval would be selected since based on the known relationship of the data packet, point 3 would occur at a larger magnitude than points 2 or 4, thus providing a better sampling point.

At some point later in time, and for this example as shown as the $3^{rd}$ data pulse, the $4^{th}$ sampling set has a magnitude greater than the $2^{nd}$ or $0^{th}$ sampling points. As such, as also described in FIG. 20 at Step 302, point 4 would be used as the sampling interval since based on the known wave shape of the data packet, the magnitude at point 4 is greater than the magnitude at point 2. Thus, the magnitude at point 4 is most likely the greatest magnitude of the data packet.

The processing described in FIG. 21 allows for the over sampling intervals to be time shifted left or right with relationship to the data packet 208 to better position the sampling intervals with the peak of the waveform. The time adjustment may shift the data packet 208, with respect to the over sampling intervals such that the peak either occurs at 2 or 4 or at over sampling point 3. For example, the $1^{st}$ pulse shown in the waveform of data packet 208 has its peak occurring exactly at the $3^{rd}$ over sampling point. As such, the timing of the sampling is very good. If, however, the peak of the waveform occurred between sampling intervals 2 and 3, the over sampling rate may be delayed with respect to the packet data 208 such that the peak either occurs at over sampling point 2 or over sampling point 3.

The preceding discussion has presented a method and apparatus for digital demodulation that may be utilized in an integrated radio receiver. By utilizing comb filters, low pass filters/equalizers and DC offset circuitry as previously described, a digital demodulator that is reliable, cost efficient (i.e., real estate efficient) is readily obtained. As one of average skill in the art will appreciate, other embodiments may be derived from the teachings of the present invention, without deviating from the scope of the claims.

What is claimed is:

1. A radio receiver comprises:

low noise amplifier operably coupled to amplify a radio frequency (RF) signal to produce an amplified RF signal;

intermediate frequency (IF) mixing module operably coupled to mix the amplified RF signal with a local oscillation to produce a digital IF signal; and digital demodulator that includes:

mixing section operably coupled to produce a digital I signal and a digital Q signal from the digital IF signal;

first digital comb filter operably coupled to filter the digital I signal to produce a filtered I signal;

second digital comb filter operably coupled to filter the digital Q signal to produce a filtered Q signal;

phase locked loop module operably coupled to produce a digital signal based on the filtered I signal and the filtered Q signal; and data recovery module operably coupled to produce a data stream from the digital signal.

2. The radio receiver of claim 1, wherein each of the first and second digital comb filters further comprises:

frequency response having notches at frequencies that substantially correspond with frequencies of interfering channel frequencies of the RF signal.

3. The radio receiver of claim 1, wherein each of the first and second digital comb filters further comprises a cascaded integrated comb filter.

4. The radio receiver of claim 1, wherein the mixing section further comprises:

state machine operably coupled to frequency shift by a factor of N and phase shift by $\pi/2$ the digital IF signal to produce the digital I signal and to frequency shift by the factor of N and phase shift by $-\pi$ the digital IF signal to produce the digital Q signal.

5. The radio receiver of claim 1, wherein the mixing section further comprises:

direct digital frequency synthesizer to produce the digital I signal and the digital Q signal from the digital IF signal.

6. The radio receiver of claim 1, wherein the IF mixing module further comprises:
local oscillation generation operably coupled to produce the local oscillation to have a Q local oscillation and an I local oscillation;
I mixer operably coupled to mix the amplified RF signal with the I local oscillation to produce an IF I signal;
Q mixer operably coupled to mix the amplified RF signal with the Q local oscillation to produce an IF Q signal;
band pass filter operably coupled to band pass filter the IF I and IF Q signals to produce a filtered IF signal;
limiter operably coupled to limit magnitude of the filtered IF signal to produce limited IF signal; and
analog to digital converter operably coupled to convert the limited IF signal into the digital IF signal.

7. The radio receiver of claim 1, wherein the phase locked loop module further comprises:
phase locked loop (PLL) operably coupled to produce a PLL signal based on the filtered I and Q signals;
low pass filter/equalizer operably coupled to equalize and low pass filter the PLL signal to produce an equalized and filtered digital signal.

8. A radio receiver comprises:
low noise amplifier operably coupled to amplify a radio frequency (RF) signal to produce an amplified RF signal;
intermediate frequency (IF) mixing module operably coupled to mix the amplified RF signal with a local oscillation to produce a digital IF signal; and
digital demodulator that includes:
mixing section operably coupled to mix the digital IF signal with a reference I signal and a reference Q signal to produce a digital I signal and a digital Q signal;
phase locked loop module operably coupled to produce a digital signal based on the digital I signal and the digital Q signal; and
data recovery module operably coupled to receive the digital signal, wherein the data recovery module includes:
DC offset module operably coupled to receive the digital signal and to determine a DC offset using a first criteria during an acquisition mode and to determined the DC offset using second criteria during a tracking mode, wherein the DC offset module substantially removes the DC offset from the digital signal to produce a DC adjusted digital signal; and
data extraction module operably coupled to sample the DC adjusted digital signal at a sample rate to produce a data stream.

9. The radio receiver of claim 8, wherein the data recovery module further comprises:
processing module; and
memory operably coupled to the processing module, wherein the memory stores operational instructions that cause the processing module to:
determine, on a packet by packet basis, the acquisition mode and the tracking mode.

10. The radio receiver of claim 9, wherein the memory further comprises operational instructions that cause the processing module to:

determine a peak value of the digital signal based on at least one of: current peak value, a previous peak value, and the first or second criteria;
determine a valley value of the digital signal based on at least one of: current valley value, a previous valley value, and the first or second criteria; and
determine the DC offset based the peak value and the valley value.

11. The radio receiver of claim 10, wherein the memory further comprises operational instructions that cause the processing module to determine the peak value by:
determine whether magnitude of the current peak value is greater than magnitude of the previous peak value;
when the magnitude of the current peak value is greater than the magnitude of the previous peak value, store the current peak value as the peak value; and
when the magnitude of the current peak value is not greater than the magnitude of the previous peak value, determine the peak value as a result of the previous peak value less a peak acquisition delta value multiplied by a difference of the current peak value and the previous peak value, wherein the first criteria indicates a greater value for the peak acquisition delta value than the second criteria.

12. The radio receiver of claim 10, wherein the memory further comprises operational instructions that cause the processing module to determine the valley value by:
determine whether absolute value of a magnitude of the current valley value is greater than absolute value of a magnitude of the valley peak value;
when the absolute value of the magnitude of the current valley value is greater than the absolute value of the magnitude of the previous valley value, store the current valley value as the valley value; and
when the absolute value of the magnitude of the current valley value is not greater than the absolute value of the magnitude of the previous valley value, determine the valley value as a result of the previous valley value plus a valley acquisition delta value multiplied by a difference of the current valley value and the previous valley value, wherein the first criteria indicates a greater value for the valley acquisition delta value than the second criteria.

13. The radio receiver of claim 10, wherein the memory further comprises operational instructions that cause the processing module to detect false peaks and false valleys by:
detect a potential peak of the digital signal;
determine magnitude of the potential peak;
determine a difference between the magnitude of the potential peak and magnitude of the valley value;
when the difference is less than a predetermined value, indicate that the potential peak is a false peak;
detect a potential valley of the digital signal;
determine magnitude of the potential valley;
determine a second difference between the magnitude of the potential valley and magnitude of the peak value; and
when the second difference is less than the predetermined value, indicate that the potential valley is a false valley.

14. The radio receiver of claim 10, wherein the memory further comprises operational instructions that cause the processing module to detect peaks and valleys by:
determine a gradient of the digital signal;
determine when the gradient changes for positive to negative;

indicate the digital signal as being at a peak when the gradient changes from positive to negative;

determine when the gradient changes for negative to positive; and indicate the digital signal as being at a valley when the gradient changes from positive to negative.

15. The radio receiver of claim 9, wherein the phase locked loop module further comprises:

phase locked loop (PLL) operably coupled to produce a PLL signal based on the filtered I and Q signals;

tapped delay line operably coupled to delay the PLL signal based on a delay signal to produce a delayed PLL signal; and low pass filter/equalizer operably coupled to equalize and low pass filter the delayed PLL signal to produce the digital signal.

16. The radio receiver of claim 15, wherein the memory further comprises operational instructions that cause the processing module to:

obtain a first reference sample prior to the sample of the DC adjusted digital signal;

obtain a second reference sample subsequent to the sample of the DC adjusted digital signal;

accumulate, over a plurality of samples of the DC adjusted digital signal, a difference between the first and second reference samples to produce an accumulated difference; and adjust the delay signal to provide less delay when the accumulated difference overflows an upper threshold and to provide more delay when the accumulated difference underflows a lower threshold.

17. The radio receiver of claim 9, wherein the memory further comprises operational instructions that cause the processing module to:

over-sample the DC adjusted digital signal at the sample rate to produce a plurality of samples per bit;

correlate alternate ones of the plurality of samples over a plurality of bits corresponding to a synchronization word of a packet of the DC adjusted digital signal to produce a plurality of correlated sample sets;

identify one of the plurality of correlated sample sets as having a best-correlation with the synchronization word to produce an identified correlated sample set;

select a sampling position of the over-sampling of the DC adjusted digital signal based on the identified correlated sample set to produce a selected sample position; and utilize samples at the selected sample position to produce the data stream.

18. The radio receiver of claim 17, wherein the memory further comprises operational instructions that cause the processing module to select the sampling position by:

compare adjacent ones of the plurality of correlated sample sets to the identified correlated sample set with respect to typical waveform of the DC adjusted digital signal to determine an over-sampling relationship of the DC adjusted digital signal;

select the sampling position to be the sampling that produces the identified correlated sample set when the sampling that produces the identified correlated sample set occurs at a most favorable point of the over-sampling relationship; and select the sampling position to be a sampling between the identified correlated sample set and an adjacent one of the plurality of correlated sample sets when the sampling between the identified correlated sample set and an adjacent one of the plurality of correlated sample sets occurs at a most favorable point of the over-sampling relationship.

19. A radio receiver comprises:

low noise amplifier operably coupled to amplify a radio frequency (RF) signal to produce an amplified RF signal;

intermediate frequency (IF) mixing module operably coupled to mix the amplified RF signal with a local oscillation to produce a digital IF signal; and digital demodulator that includes:

mixing section operably coupled to mix the digital IF signal with a reference I signal and a reference Q signal to produce a digital I signal and a digital Q signal;

phase locked loop operably coupled to produce a digital signal based on the digital I signal and the digital Q signal;

low pass filter/equalizer module operably coupled to the phased locked loop to equalize and low pass filter the digital signal to produce an equalized and filtered signal;

data recovery module operably coupled to produce a data stream from the filtered digital signal.

20. The radio receiver of claim 19, wherein the low pass filter/equalizer further comprises:

digital logic circuit to provide a zero at approximately baseband.

21. The radio receiver of claim 19, wherein the low pass filter/equalizer further comprises:

first digital comb filter that has a frequency response having notches at frequencies that substantially correspond with frequencies of interfering channel frequencies of the RF signal; and second digital comb filter that has a frequency response having notches at frequencies that substantially correspond with image frequencies of at least one of the mixing section and the IF mixing module.

22. The radio receiver of claim 19, wherein the low pass filter/equalizer module further comprises:

frequency step down module operably coupled to reduce frequency of the filtered digital signal.

23. A radio receiver comprises:

low noise amplifier operably coupled to amplify a radio frequency (RF) signal to produce an amplified RF signal;

intermediate frequency (IF) mixing module operably coupled to mix the amplified RF signal with a local oscillation to produce an IF I signal and an IF Q signal;

polyphase filter operably coupled to filter the IF I and Q signals and to provide image rejection of the location oscillation to produce a filtered I signal and a filtered Q signal;

limiting module operably coupled to limit magnitude of the filtered I signal to produce a limited I signal;

analog to digital converter operably coupled to convert the limited I signal into a digital I signal; and digital demodulator that includes:

mixing section operably coupled to mix the digital I signal with a reference I signal and a reference Q signal to produce a digital baseband I signal and a digital baseband Q signal;

phase locked loop module operably coupled to produce a digital signal based on the digital baseband I signal and the digital baseband Q signal; and data recovery module operably coupled to produce a data stream from the digital signal.

24. The radio receiver of claim 23, wherein the mixing section further comprises:

first digital comb filter operably coupled to filter a product of the mixing of the digital I signal with the reference I signal to produce the digital baseband I signal;

second digital comb filter operably coupled to filter a product of the mixing of the digital Q signal with the reference Q signal to produce the digital baseband Q signal.

25. The radio receiver of claim 24, wherein the mixing section further comprises:

state machine operably coupled to frequency shift by a factor of N and phase shift by $\pi/2$ the digital I signal to produce the product of the mixing of the digital I signal with the reference I signal and to frequency shift by the factor of N and phase shift by $-\pi$ the digital I signal to produce the product of the mixing of the digital Q signal with the reference Q signal.

26. The radio receiver of claim 23, wherein the data recovery module further comprises:

DC offset module operably coupled to receive the digital signal and to determine a DC offset using a first criteria during an acquisition mode and to determined the DC offset using second criteria during a tracking mode, wherein the DC offset module substantially removes the DC offset from the digital signal to produce a DC adjusted digital signal; and data extraction module operably coupled to sample the DC adjusted digital signal at a sample rate to produce a data stream.

27. The radio receiver of claim 23, wherein the digital demodulator further comprises:

low pass filter/equalizer module operably coupled between the phased locked loop and the data recovery module, wherein the low pass filter/equalizer equalize and low pass filter the digital signal to produce an equalized and filtered digital signal.

28. A method for receiving a radio frequency (RF) signal, the method comprises:

amplifying the RF signal to produce an amplified RF signal;

mixing the amplified RF signal with a local oscillation to produce a digital IF signal;

producing a digital Q signal and a digital I signal from a synthesized frequency and the digital IF signal;

comb filtering the digital I signal to produce a filtered I signal;

comb filtering the digital Q signal to produce a filtered Q signal;

generating a digital signal based on the filtered I signal and the filtered Q signal via a phase locked loop function; and producing a data stream from the digital signal.

29. The method of claim 28, wherein the comb filtering the digital I and Q signals further comprises:

filtering frequencies that substantially correspond with frequencies of interfering channel frequencies of the RF signal and passing other frequencies.

30. The method of claim 28, wherein the producing the digital I and Q signals further comprises:

shifting frequency by a factor of N and phase by $\pi/2$ of the digital IF signal to produce the digital I signal; and shifting frequency by the factor of N and phase by $-\pi$ of the digital IF signal to produce the digital Q signal.

31. The method of claim 28, wherein the mixing the amplified RF signal with the local oscillation further comprises:

generating the local oscillation to have a Q local oscillation and an I local oscillation;

mixing the amplified RF signal with the I local oscillation to produce an IF I signal;

mixing the amplified RF signal with the Q local oscillation to produce an IF Q signal;

band pass filtering the IF I and Q signals to produce a filtered IF signal;

limiting magnitude of the filtered IF signal to produce limited IF signal; and converting the limited IF signal into the digital IF signal.

32. The method of claim 28, wherein the generating the digital signal further comprises:

producing a phase locked loop (PLL) signal based on the filtered I and Q signals; and equalizing and low pass filtering the PLL signal to produce an equalized and filtered signal.

33. A method for data detection, the method comprises:

receiving a digital signal;

determining a DC offset using a first criteria during an acquisition mode and using second criteria during a tracking mode;

substantially removing the DC offset from the digital signal to produce a DC adjusted digital signal; and sampling the DC adjusted digital signal at a sample rate to produce a data stream.

34. The method of claim 33 further comprises:

determining, on a packet by packet basis, the acquisition mode and the tracking mode.

35. The method of claim 33, wherein the determining the DC offset further comprises:

determining a peak value of the digital signal based on a current peak value, a previous peak value, and the first or second criteria;

determining a valley value of the digital signal based on a current valley value, a previous valley value, and the first or second criteria; and determining the DC offset based the peak value and the valley value.

36. The method of claim 35, wherein the determining the peak value further comprises:

determining whether magnitude of the current peak value is greater than magnitude of the previous peak value;

when the magnitude of the current peak value is greater than the magnitude of the previous peak value, storing the current peak value as the peak value; and when the magnitude of the current peak value is not greater than the magnitude of the previous peak value, determining the peak value as a result of the previous peak value less a peak acquisition delta value multiplied by a difference of the current peak value and the previous peak value, wherein the first criteria indicates a greater value for the peak acquisition delta value than the second criteria.

37. The method of claim 35, wherein the determine the valley value further comprises:

determining whether absolute value of a magnitude of the current valley value is greater than absolute value of a magnitude of the valley peak value;

when the absolute value of the magnitude of the current valley value is greater than the absolute value of the magnitude of the previous valley value, storing the current valley value as the valley value; and when the absolute value of the magnitude of the current valley value is not greater than the absolute value of the magnitude of the previous valley value, determining the valley value as a result of the previous valley value plus a valley acquisition delta value multiplied by a difference of the current valley value and the previous valley value, wherein the first criteria indicates a greater value for the valley acquisition delta value than the second criteria.

38. The method of claim 35 further comprises detecting false peaks and false valleys by:

detecting a potential peak of the digital signal;

determining magnitude of the potential peak;

determining a difference between the magnitude of the potential peak and magnitude of the valley value;

when the difference is less than a predetermined value, indicating that the potential peak is a false peak;

detecting a potential valley of the digital signal;

determining magnitude of the potential valley;

determining a second difference between the magnitude of the potential valley and magnitude of the peak value; and when the second difference is less than the predetermined value, indicating that the potential valley is a false valley.

39. The method of claim 35 further comprises detecting peaks and valleys by:

determining a gradient of the digital signal;

determining when the gradient changes for positive to negative;

indicating the digital signal as being at a peak when the gradient changes from positive to negative;

determining when the gradient changes for negative to positive; and indicating the digital signal as being at a valley when the gradient changes from positive to negative.

40. The method of claim 33 further comprises:

obtaining a first reference sample prior to the sampling of the DC adjusted digital signal;

obtaining a second reference sample subsequent to the sampling of the DC adjusted digital signal;

accumulating, over a plurality of samples of the DC adjusted digital signal, a difference between the first and second reference samples to produce an accumulated difference; and adjusting the sampling when the accumulated difference overflows an upper threshold or when the accumulated difference underflows a lower threshold.

41. The method of claim 33, wherein the sampling the DC adjusted digital signal further comprises:

over-sampling the DC adjusted digital signal at the sample rate to produce a plurality of samples per bit;

correlating alternate ones of the plurality of samples over a plurality of bits corresponding to a synchronization word of a packet of the DC adjusted digital signal to produce a plurality of correlated sample sets;

identifying one of the plurality of correlated sample sets as having a best-correlation with the synchronization word to produce an identified correlated sample set;

selecting a sampling position of the over-sampling of the DC adjusted digital signal based on the identified correlated sample set to produce a selected sample position; and utilizing samples at the selected sample position to produce the data stream.

42. The method of claim 41, wherein the selecting the sampling position further comprises:

comparing adjacent ones of the plurality of correlated sample sets to the identified correlated sample set with respect to typical waveform of the DC adjusted digital signal to determine an over-sampling relationship of the DC adjusted digital signal;

selecting the sampling position to be the sampling that produces the identified correlated sample set when the sampling that produces the identified correlated sample set occurs at a most favorable point of the over-sampling relationship; and selecting the sampling position to be a sampling between the identified correlated sample set and an adjacent one of the plurality of correlated sample sets when the sampling between the identified correlated sample set and an adjacent one of the plurality of correlated sample sets occurs at a most favorable point of the over-sampling relationship.

43. A method for receiving a radio frequency (RF) signal, the method comprises:

amplifying the RF signal to produce an amplified RF signal;

mixing the amplified RF signal with a local oscillation to produce a digital IF signal;

mixing the digital IF signal with a reference I signal and a reference Q signal to produce a digital I signal and a digital Q signal;

producing a digital signal based on the digital I signal and the digital Q signal using a phase locked loop function;

equalizing and low pass filtering the digital signal to produce an equalized and filtered digital signal; and producing a data stream from the filtered digital signal.

44. The method of claim 43, wherein the equalizing and low pass filtering the digital signal further comprises:

filtering, with a zero at approximately baseband, the digital signal.

45. The method of claim 43, wherein the equalizing and low pass filtering further comprises:

filtering frequencies that substantially correspond with frequencies of interfering channel frequencies of the RF signal and passing other frequencies; and filtering frequencies that substantially correspond with image frequencies of at least one of: the mixing the amplified RF signal with the local oscillation and the mixing the digital IF signal with the reference I signal and the reference Q signal.

46. The method of claim 43 further comprises:

reducing frequency of the filtered digital signal.

47. An apparatus for receiving a radio frequency (RF) signal, the apparatus comprises:

processing module; and memory operably coupled to the processing module, wherein the memory includes operational instructions that cause the processing module to:

amplify the RF signal to produce an amplified RF signal;

mix the amplified RF signal with a local oscillation to produce a digital IF signal;

produce a digital Q signal and a digital I signal from a synthesized frequency and the digital IF signal;

comb filter the digital I signal to produce a filtered I signal;

comb filter the digital Q signal to produce a filtered Q signal;

generate a digital signal based on the filtered I signal and the filtered Q signal via a phase locked loop function; and produce a data stream from the digital signal.

48. The apparatus of claim 47, wherein the memory further comprises operational instructions that cause the processing module to comb filter the digital I and Q signals by:

filtering frequencies that substantially correspond with frequencies of interfering channel frequencies of the RF signal and passing other frequencies.

49. The apparatus of claim 47, wherein the memory further comprises operational instructions that cause the processing module to produce the digital I and Q signals by:

shifting frequency by a factor of N and phase by $\pi/2$ of the digital IF signal to produce the digital I signal; and shifting frequency by the factor of N and phase by $-\pi$ of the digital IF signal to produce the digital Q signal.

50. The apparatus of claim 47, wherein the memory further comprises operational instructions that cause the processing module to mix the amplified RF signal with the local oscillation by:

generating the local oscillation to have a Q local oscillation and an I local oscillation;

mixing the amplified RF signal with the I local oscillation to produce an IF I signal;

mixing the amplified RF signal with the Q local oscillation to produce an IF Q signal;

band pass filtering the IF I signal and the IF Q signal to produce a filtered I signal and a filtered Q signal, respectively;

limiting magnitude of the filtered I and Q signals to produce limited I and Q signals; and converting the limited I and Q signals into the digital IF signal.

51. The apparatus of claim 47, wherein the memory further comprises operational instructions that cause the processing module to generate the digital signal by:

producing a phase locked loop (PLL) signal based on the filtered I and Q signals; and equalizing and low pass filtering the PLL signal to produce an equalized and filtered digital signal.

52. An apparatus for data detection, the apparatus comprises:

processing module; and memory operably coupled to the processing module, wherein the memory includes operational instructions that cause the processing module to:

receive a digital signal;

determine a DC offset using a first criteria during an acquisition mode and using second criteria during a tracking mode;

substantially remove the DC offset from the digital signal to produce a DC adjusted digital signal; and sample the DC adjusted digital signal at a sample rate to produce a data stream.

53. The apparatus of claim 52, wherein the memory further comprises operational instructions that cause the processing module to:

determine, on a packet by packet basis, the acquisition mode and the tracking mode.

54. The apparatus of claim 52, wherein the memory further comprises operational instructions that cause the processing module to determine the DC offset by:

determining a peak value of the digital signal based on a current peak value, a previous peak value, and the first or second criteria;

determine a valley value of the digital signal based on a current valley value, a previous valley value, and the first or second criteria; and determine the DC offset based the peak value and the valley value.

55. The apparatus of claim 54, wherein the memory further comprises operational instructions that cause the processing module to determine the peak value by:

determining whether magnitude of the current peak value is greater than magnitude of the previous peak value;

when the magnitude of the current peak value is greater than the magnitude of the previous peak value, storing the current peak value as the peak value; and when the magnitude of the current peak value is not greater than the magnitude of the previous peak value, determining the peak value as a result of the previous peak value less a peak acquisition delta value multiplied by a difference of the current peak value and the previous peak value, wherein the first criteria indicates a greater value for the peak acquisition delta value than the second criteria.

56. The apparatus of claim 54, wherein the memory further comprises operational instructions that cause the processing module to determine the valley value by:

determining whether absolute value of a magnitude of the current valley value is greater than absolute value of a magnitude of the valley peak value;

when the absolute value of the magnitude of the current valley value is greater than the absolute value of the magnitude of the previous valley value, storing the current valley value as the valley value; and when the absolute value of the magnitude of the current valley value is not greater than the absolute value of the magnitude of the previous valley value, determining the valley value as a result of the previous valley value plus a valley acquisition delta value multiplied by a difference of the current valley value and the previous valley value, wherein the first criteria indicates a greater value for the valley acquisition delta value than the second criteria.

57. The apparatus of claim 54, wherein the memory further comprises operational instructions that cause the processing module to detect false peaks and false valleys by:

detecting a potential peak of the digital signal;

determining magnitude of the potential peak;

determining a difference between the magnitude of the potential peak and magnitude of the valley value;

when the difference is less than a predetermined value, indicating that the potential peak is a false peak;

detecting a potential valley of the digital signal;

determining magnitude of the potential valley;

determining a second difference between the magnitude of the potential valley and magnitude of the peak value; and when the second difference is less than the predetermined value, indicating that the potential valley is a false valley.

58. The apparatus of claim 52, wherein the memory further comprises operational instructions that cause the processing module to detect peaks and valleys by:
   determining a gradient of the digital signal;
   determining when the gradient changes for positive to negative;
   indicating the digital signal as being at a peak when the gradient changes from positive to negative;
   determining when the gradient changes for negative to positive; and
   indicating the digital signal as being at a valley when the gradient changes from positive to negative.

59. The apparatus of claim 52, wherein the memory further comprises operational instructions that cause the processing module to:
   obtain a first reference sample prior to the sampling of the DC adjusted digital signal;
   obtain a second reference sample subsequent to the sampling of the DC adjusted digital signal;
   accumulate, over a plurality of samples of the DC adjusted digital signal, a difference between the first and second reference samples to produce an accumulated difference; and
   adjust the sampling when the accumulated difference overflows an upper threshold or when the accumulated difference underflows a lower threshold.

60. The apparatus of claim 52, wherein the memory further comprises operational instructions that cause the processing module to sampling the DC adjusted digital signal by:
   over-sampling the DC adjusted digital signal at the sample rate to produce a plurality of samples per bit;
   correlating alternate ones of the plurality of samples over a plurality of bits corresponding to a synchronization word of a packet of the DC adjusted digital signal to produce a plurality of correlated sample sets;
   identifying one of the plurality of correlated sample sets as having a best-correlation with the synchronization word to produce an identified correlated sample set;
   selecting a sampling position of the over-sampling of the DC adjusted digital signal based on the identified correlated sample set to produce a selected sample position; and
   utilizing samples at the selected sample position to produce the data stream.

61. The apparatus of claim 60, wherein the memory further comprises operational instructions that cause the processing module to select the sampling position by:
   comparing adjacent ones of the plurality of correlated sample sets to the identified correlated sample set with respect to typical waveform of the DC adjusted digital signal to determine an over-sampling relationship of the DC adjusted digital signal;
   selecting the sampling position to be the sampling that produces the identified correlated sample set when the sampling that produces the identified correlated sample set occurs at a most favorable point of the over-sampling relationship; and
   selecting the sampling position to be a sampling between the identified correlated sample set and an adjacent one of the plurality of correlated sample sets when the sampling between the identified correlated sample set and an adjacent one of the plurality of correlated sample sets occurs at a most favorable point of the over-sampling relationship.

62. An apparatus for receiving a radio frequency (RF) signal, the apparatus comprises:
   processing module; and
   memory operably coupled to the processing module, wherein the memory includes operational instructions that cause the processing module to:
   amplify the RF signal to produce an amplified RF signal;
   mix the amplified RF signal with a local oscillation to produce a digital IF signal;
   mix the digital IF signal with a reference I signal and a reference Q signal to produce a digital I signal and a digital Q signal;
   produce a digital signal based on the digital I signal and the digital Q signal using a phase locked loop function;
   equalize and filter the digital signal to produce an equalized and filtered signal; and
   produce a data stream from the filtered digital signal.

63. The apparatus of claim 62, wherein the memory further comprises operational instructions that cause the processing module to equalize the digital signal by:
   filtering, with a zero at approximately baseband, the digital signal to produce the equalized signal.

64. The apparatus of claim 62, wherein the memory further comprises operational instructions that cause the processing module to comb filter the equalized signal by:
   filtering frequencies that substantially correspond with frequencies of interfering channel frequencies of the RF signal and passing other frequencies; and
   filtering frequencies that substantially correspond with image frequencies of at least one of: the mixing the amplified RF signal with the local oscillation and the mixing the digital IF signal with the reference I signal and the reference Q signal.

65. The apparatus of claim 62, wherein the memory further comprises operational instructions that cause the processing module to:
   reduce frequency of the filtered digital signal.

* * * * *